US012470879B2

(12) United States Patent
Qi et al.

(10) Patent No.: US 12,470,879 B2
(45) **Date of Patent: *Nov. 11, 2025**

(54) SYSTEMS AND METHODS FOR SUPPRESSING SOUND LEAKAGE

(71) Applicant: SHENZHEN SHOKZ CO., LTD., Guangdong (CN)

(72) Inventors: Xin Qi, Shenzhen (CN); Fengyun Liao, Shenzhen (CN); Lei Zhang, Shenzhen (CN); Junjiang Fu, Shenzhen (CN); Bingyan Yan, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 311 days.

This patent is subject to a terminal disclaimer.

(21) Appl. No.: 18/154,022

(22) Filed: Jan. 12, 2023

(65) Prior Publication Data

US 2023/0156412 A1 May 18, 2023

Related U.S. Application Data

(63) Continuation of application No. 17/171,207, filed on Feb. 9, 2021, now Pat. No. 11,582,564, which is a (Continued)

(30) Foreign Application Priority Data

Jan. 6, 2014 (CN) ......................... 201410005804.0
Apr. 30, 2019 (CN) ......................... 201910364346.2

(Continued)

(51) Int. Cl.
*G10K 9/13* (2006.01)
*G10K 9/22* (2006.01)

(Continued)

(52) U.S. Cl.
CPC ............. *H04R 25/505* (2013.01); *G10K 9/13* (2013.01); *G10K 9/22* (2013.01); *G10K 11/175* (2013.01);

(Continued)

(58) Field of Classification Search
CPC .... H04R 25/505; H04R 1/2811; H04R 9/066; H04R 1/2876; H04R 17/00;

(Continued)

(56) References Cited

U.S. PATENT DOCUMENTS 2,327,320 A 8/1943 Shapiro
4,987,597 A 1/1991 Haertl (Continued)

FOREIGN PATENT DOCUMENTS

CN 1270488 A 10/2000
CN 201616895 U * 10/2010

(Continued)

OTHER PUBLICATIONS

International Search Report in PCT/CN2014/094065 mailed on Mar. 17, 2015, 5 pages.

(Continued)

*Primary Examiner* — Fan S Tsang
*Assistant Examiner* — Tyler Michael Liebgott
(74) *Attorney, Agent, or Firm* — METIS IP LLC

(57) ABSTRACT

A speaker comprises a housing, a transducer residing inside the housing, and at least one sound guiding hole located on the housing. The transducer generates vibrations. The vibrations produce a sound wave inside the housing and cause a leaked sound wave spreading outside the housing from a portion of the housing. The at least one sound guiding hole guides the sound wave inside the housing through the at least one sound guiding hole to an outside of the housing. The guided sound wave interferes with the leaked sound wave in (Continued)

a target region. The interference at a specific frequency relates to a distance between the at least one sound guiding hole and the portion of the housing.

20 Claims, 19 Drawing Sheets

Related U.S. Application Data continuation-in-part of application No. 17/074,762, filed on Oct. 20, 2020, now Pat. No. 11,197,106, which is a continuation-in-part of application No. 16/813,915, filed on Mar. 10, 2020, now Pat. No. 10,848,878, which is a continuation of application No. 16/419,049, filed on May 22, 2019, now Pat. No. 10,616,696, which is a continuation of application No. 16/180,020, filed on Nov. 5, 2018, now Pat. No. 10,334,372, which is a continuation of application No. 15/650,909, filed on Jul. 16, 2017, now Pat. No. 10,149,071, which is a continuation of application No. 15/109,831, filed as application No. PCT/CN2014/094065 on Dec. 17, 2014, now Pat. No. 9,729,978, said application No. 17/074,762 is a continuation-in-part of application No. PCT/CN2020/084161, filed on Apr. 10, 2020.

(30) Foreign Application Priority Data

Sep. 19, 2019 (CN) ........................ 201910888067.6
Sep. 19, 2019 (CN) ........................ 201910888762.2

(51) Int. Cl.

| | |
|---|---|
| ***G10K 11/175*** | (2006.01) |
| ***G10K 11/178*** | (2006.01) |
| ***G10K 11/26*** | (2006.01) |
| ***H04R 1/28*** | (2006.01) |
| ***H04R 9/06*** | (2006.01) |
| ***H04R 25/00*** | (2006.01) |
| *H04R 17/00* | (2006.01) |

(52) U.S. Cl.

CPC ............ *G10K 11/178* (2013.01); *G10K 11/26* (2013.01); *H04R 1/2811* (2013.01); *H04R 9/066* (2013.01); *G10K 2210/3216* (2013.01); *H04R 1/2876* (2013.01); *H04R 17/00* (2013.01); *H04R 2460/13* (2013.01)

(58) Field of Classification Search

CPC ........ H04R 2460/13; G10K 9/13; G10K 9/22; G10K 11/175; G10K 11/178; G10K 11/26; G10K 2210/3216

See application file for complete search history.

(56) References Cited

U.S. PATENT DOCUMENTS 5,430,803 A 7/1995 Kimura et al.
5,572,594 A 11/1996 Devoe et al.
5,692,059 A 11/1997 Kruger
5,757,935 A 5/1998 Kang et al.
5,790,684 A 8/1998 Niino et al.
6,850,138 B1 2/2005 Sakai
7,317,806 B2 1/2008 Harvey et al.
8,141,678 B2 3/2012 Ikeyama et al.
8,891,800 B1 11/2014 Shaffer
9,036,851 B2 5/2015 Peng
9,226,075 B2 12/2015 Lee
9,648,412 B2 5/2017 Timothy et al.
9,729,978 B2 8/2017 Qi et al.
9,794,676 B2 10/2017 Shetye et al.
9,985,596 B1 5/2018 Litovsky et al.
10,334,372 B2 6/2019 Qi et al.
10,375,479 B2 8/2019 Graber
10,499,140 B2 12/2019 Gong et al.
10,506,362 B1 12/2019 Gomes
10,616,696 B2 4/2020 Qi et al.
10,631,075 B1 4/2020 Patil et al.
10,897,677 B2 1/2021 Walravens et al.
11,197,106 B2 12/2021 Qi et al.
11,582,563 B2 2/2023 Qi et al.
11,622,212 B2 4/2023 Qi et al.
2003/0048913 A1 3/2003 Lee et al.
2004/0105568 A1 6/2004 Lee
2004/0131219 A1 7/2004 Polk, Jr.
2005/0251952 A1 11/2005 Johnson
2006/0094481 A1 5/2006 Gullickson
2006/0098829 A1 5/2006 Kobayashi
2007/0034493 A1 2/2007 Kawasaki et al.
2007/0041595 A1 2/2007 Carazo et al.
2007/0237341 A1 10/2007 Laroche
2007/0274556 A1* 11/2007 Matsumura ............ H04R 9/025 381/412
2008/0144874 A1 6/2008 Wu et al.
2008/0287063 A1 11/2008 Kidron et al.
2009/0028375 A1 1/2009 Richoux et al.
2009/0095613 A1 4/2009 Lin
2009/0141920 A1 6/2009 Suyama
2009/0147981 A1 6/2009 Blanchard et al.
2009/0190781 A1 7/2009 Fukuda
2009/0285417 A1 11/2009 Shin et al.
2009/0290730 A1 11/2009 Fukuda et al.
2009/0304209 A1* 12/2009 Nakatani ............. H04R 1/1075 381/151
2010/0054492 A1 3/2010 Eaton et al.
2010/0080400 A1 4/2010 Sibbald et al.
2010/0246864 A1 9/2010 Hildebrandt et al.
2010/0322454 A1 12/2010 Ambrose et al.
2011/0150262 A1 6/2011 Nakama et al.
2012/0020501 A1 1/2012 Lee
2012/0070022 A1 3/2012 Saiki
2012/0177206 A1 7/2012 Yamagishi et al.
2012/0201406 A1 8/2012 Yamaguchi
2012/0224710 A1 9/2012 Terlizzi et al.
2012/0263324 A1 10/2012 Joyce et al.
2013/0051585 A1 2/2013 Karkkainen et al.
2013/0188803 A1 7/2013 Shaanan et al.
2013/0329919 A1 12/2013 He
2014/0009008 A1 1/2014 Li et al.
2014/0064533 A1 3/2014 Kasic, II
2014/0185822 A1 7/2014 Kunimoto et al.
2014/0185837 A1 7/2014 Kunimoto et al.
2014/0274229 A1 9/2014 Fukuda
2014/0294182 A1 10/2014 Axelsson et al.
2014/0315605 A1 10/2014 Cho et al.
2014/0321674 A1 10/2014 Abolfathi
2014/0355777 A1 12/2014 Nabata et al.
2015/0030189 A1 1/2015 Nabata et al.
2015/0256656 A1 9/2015 Horii
2015/0264473 A1 9/2015 Fukuda
2015/0268673 A1 9/2015 Farzbod et al.
2015/0326967 A1 11/2015 Otani
2016/0037243 A1 2/2016 Lippert et al.
2016/0037256 A1 2/2016 Katsuda et al.
2016/0050474 A1 2/2016 Rye et al.
2016/0150337 A1 5/2016 Nandy
2016/0165357 A1 6/2016 Morishita et al.
2016/0295328 A1 10/2016 Park
2017/0180878 A1 6/2017 Petersen et al.
2017/0201823 A1 7/2017 Shetye et al.
2017/0280227 A1 9/2017 Huang
2018/0167710 A1 6/2018 Silver et al.
2018/0182370 A1 6/2018 Hyde et al.
2018/0288518 A1 10/2018 Schmidt et al.
2018/0352319 A1 12/2018 Liang et al.
2018/0367885 A1 12/2018 Gong et al.
2018/0376231 A1 12/2018 Pfaffinger
2019/0052954 A1 2/2019 Rusconi Clerici Beltrami et al.
2019/0090063 A1 3/2019 Chen

(56) References Cited

U.S. PATENT DOCUMENTS

| | | | |
|---|---|---|---|
| 2019/0238971 | A1 | 8/2019 | Wakeland et al. |
| 2019/0320258 | A1 | 10/2019 | Ohura |
| 2020/0367008 | A1 | 11/2020 | Walsh et al. |
| 2021/0099027 | A1 | 4/2021 | Larsson et al. |
| 2021/0168484 | A1 | 6/2021 | Li et al. |
| 2021/0219059 | A1 | 7/2021 | Qi et al. |
| 2021/0219067 | A1 | 7/2021 | Zhang et al. |
| 2021/0219073 | A1 | 7/2021 | Zhang et al. |
| 2024/0276155 | A1 | 8/2024 | Li et al. |

FOREIGN PATENT DOCUMENTS

| | | | |
|---|---|---|---|
| CN | 201690580 | U | 12/2010 |
| CN | 102014328 | A | 4/2011 |
| CN | 102421043 | A | 4/2012 |
| CN | 202435600 | U | 9/2012 |
| CN | 103167390 | A | 6/2013 |
| CN | 103347235 | A | 10/2013 |
| CN | 204206450 | U | 3/2015 |
| CN | 208210280 | U | 12/2018 |
| CN | 109495809 | A | 3/2019 |
| CN | 109547888 | A | 3/2019 |
| CN | 209330353 | U | 8/2019 |
| EP | 2512155 | A1 | 10/2012 |
| EP | 2011367 | B1 | 12/2014 |
| GB | 2461929 | A | 1/2010 |
| JP | 2006332715 | A | 12/2006 |
| JP | 2007251358 | A | 9/2007 |
| KR | 20050030183 | A | 3/2005 |
| KR | 20090082999 | A | 8/2009 |
| WO | 02078393 | A2 | 10/2002 |
| WO | 2004095878 | A2 | 11/2004 |
| WO | 2021133679 | A1 | 7/2021 |

OTHER PUBLICATIONS

Written Opinion in PCT/CN2014/094065 mailed on Mar. 17, 2015, 10 pages.

International Search Report in PCT/CN2020/084161 mailed on Jul. 6, 2020, 4 pages.

Written Opinion in PCT/CN2020/084161 mailed on Jul. 6, 2020, 4 pages.

First Office Action in Chinese application No. 201410005804.0 mailed on Dec. 17, 2015, 10 pages.

The Extended European Search Report in European Application No. 14877111.6 mailed on Mar. 17, 2017, 6 pages.

First Examination Report in Indian Application No. 201617026062 mailed on Nov. 13, 2020, 6 pages.

Notice of Reasons for Rejection in Japanese Application No. 2016-545828 mailed on Oct. 10, 2017, 6 pages.

Partial Supplementary European Search Report in European Application No. 20798021.0 mailed on Apr. 22, 2022, 9 pages.

Notice of Preliminary Rejection in Korean Application No. 10-2022-7010046 mailed on Jun. 20, 2022, 15 pages.

The Extended European Search Report in European Application No. 20798021.0 mailed on Jul. 11, 2022, 18 pages.

First Examination Report in Indian Application No. 202117049086 mailed on Jul. 4, 2022, 6 pages.

Decision of Grant in Russian Application No. 2021131611 mailed on Sep. 27, 2022, 16 pages.

Notice of Reasons for Rejection in Japanese Application No. 2021-564584 mailed on Jan. 10, 2023, 13 pages.

Decision of Patent Grant in Korean Application No. 10-2021-7039003 mailed on Jan. 30, 2023, 4 pages.

* cited by examiner

SYSTEMS AND METHODS FOR SUPPRESSING SOUND LEAKAGE

CROSS-REFERENCE TO RELATED APPLICATIONS

The present application is a continuation of U.S. patent application Ser. No. 17/171,207 filed on Feb. 9, 2021, which is a continuation-in-part of U.S. patent application Ser. No. 17/074,762 (now U.S. Patent U.S. Pat. No. 11,197,106) filed on Oct. 20, 2020, which is a continuation-in-part of U.S. patent application Ser. No. 16/813,915 (now U.S. Patent U.S. Pat. No. 10,848,878) filed on Mar. 10, 2020, which is a continuation of U.S. patent application Ser. No. 16/419,049 (now U.S. Patent U.S. Pat. No. 10,616,696) filed on May 22, 2019, which is a continuation of U.S. patent application Ser. No. 16/180,020 (now U.S. Patent U.S. Pat. No. 10,334,372) filed on Nov. 5, 2018, which is a continuation of U.S. patent application Ser. No. 15/650,909 (now U.S. Patent U.S. Pat. No. 10,149,071) filed on Jul. 16, 2017, which is a continuation of U.S. patent application Ser. No. 15/109,831 (now U.S. Patent U.S. Pat. No. 9,729,978) filed on Jul. 6, 2016, which is a U.S. National Stage entry under 35 U.S.C. § 371 of International Application No. PCT/CN2014/094065, filed on Dec. 17, 2014, designating the United States of America, which claims priority to Chinese Patent Application No. 201410005804.0, filed on Jan. 6, 2014; U.S. patent application Ser. No. 17/171,207 is a continuation-in-part of International Application No. PCT/CN2020/084161, filed on Apr. 10, 2020, and claims priority to Chinese Patent Application No. 201910888067.6, filed on Sep. 19, 2019, Chinese Patent Application No. 201910888762.2, filed on Sep. 19, 2019, and Chinese Patent Application No. 201910364346.2, filed on Apr. 30, 2019. Each of the above-referenced applications is hereby incorporated by reference.

FIELD OF THE INVENTION

This application relates to a bone conduction device, and more specifically, relates to methods and systems for reducing sound leakage by a bone conduction device.

BACKGROUND

A bone conduction speaker, which may be also called a vibration speaker, may push human tissues and bones to stimulate the auditory nerve in cochlea and enable people to hear sound. The bone conduction speaker is also called a bone conduction headphone.

An exemplary structure of a bone conduction speaker based on the principle of the bone conduction speaker is shown in FIGS. 1A and 1B. The bone conduction speaker may include an open housing 110, a vibration board 121, a transducer 122, and a linking component 123. The transducer 122 may transduce electrical signals to mechanical vibrations. The vibration board 121 may be connected to the transducer 122 and vibrate synchronically with the transducer 122. The vibration board 121 may stretch out from the opening of the housing 110 and contact with human skin to pass vibrations to auditory nerves through human tissues and bones, which in turn enables people to hear sound. The linking component 123 may reside between the transducer 122 and the housing 110, configured to fix the vibrating transducer 122 inside the housing 110. To minimize its effect on the vibrations generated by the transducer 122, the linking component 123 may be made of an elastic material.

However, the mechanical vibrations generated by the transducer 122 may not only cause the vibration board 121 to vibrate, but may also cause the housing 110 to vibrate through the linking component 123. Accordingly, the mechanical vibrations generated by the bone conduction speaker may push human tissues through the bone board 121, and at the same time a portion of the vibrating board 121 and the housing 110 that are not in contact with human issues may nevertheless push air. Air sound may thus be generated by the air pushed by the portion of the vibrating board 121 and the housing 110. The air sound may be called "sound leakage." In some cases, sound leakage is harmless. However, sound leakage should be avoided as much as possible if people intend to protect privacy when using the bone conduction speaker or try not to disturb others when listening to music.

Attempting to solve the problem of sound leakage, Korean patent KR10-2009-0082999 discloses a bone conduction speaker of a dual magnetic structure and double-frame. As shown in FIG. 2, the speaker disclosed in the patent includes: a first frame 210 with an open upper portion and a second frame 220 that surrounds the outside of the first frame 210. The second frame 220 is separately placed from the outside of the first frame 210. The first frame 210 includes a movable coil 230 with electric signals, an inner magnetic component 240, an outer magnetic component 250, a magnet field formed between the inner magnetic component 240, and the outer magnetic component 250. The inner magnetic component 240 and the out magnetic component 250 may vibrate by the attraction and repulsion force of the coil 230 placed in the magnet field. A vibration board 260 connected to the moving coil 230 may receive the vibration of the moving coil 230. A vibration unit 270 connected to the vibration board 260may pass the vibration to a user by contacting with the skin. As described in the patent, the second frame 220 surrounds the first frame 210, in order to use the second frame 220 to prevent the vibration of the first frame 210 from dissipating the vibration to outsides, and thus may reduce sound leakage to some extent.

However, in this design, since the second frame 220 is fixed to the first frame 210, vibrations of the second frame 220 are inevitable. As a result, sealing by the second frame 220 is unsatisfactory. Furthermore, the second frame 220 increases the whole volume and weight of the speaker, which in turn increases the cost, complicates the assembly process, and reduces the speaker's reliability and consistency.

SUMMARY

The embodiments of the present application disclose methods and system of reducing sound leakage of a bone conduction speaker.

In one aspect, the embodiments of the present application disclose a method of reducing sound leakage of a bone conduction speaker, including:

- providing a bone conduction speaker including a vibration board fitting human skin and passing vibrations, a transducer, and a housing, wherein at least one sound guiding hole is located in at least one portion of the housing;
- the transducer drives the vibration board to vibrate;
- the housing vibrates, along with the vibrations of the transducer, and pushes air, forming a leaked sound wave transmitted in the air;

the air inside the housing is pushed out of the housing through the at least one sound guiding hole, interferes with the leaked sound wave, and reduces an amplitude of the leaked sound wave.

In some embodiments, one or more sound guiding holes may locate in an upper portion, a central portion, and/or a lower portion of a sidewall and/or the bottom of the housing.

In some embodiments, a damping layer may be applied in the at least one sound guiding hole in order to adjust the phase and amplitude of the guided sound wave through the at least one sound guiding hole.

In some embodiments, sound guiding holes may be configured to generate guided sound waves having a same phase that reduce the leaked sound wave having a same wavelength; sound guiding holes may be configured to generate guided sound waves having different phases that reduce the leaked sound waves having different wavelengths.

In some embodiments, different portions of a same sound guiding hole may be configured to generate guided sound waves having a same phase that reduce the leaked sound wave having same wavelength. In some embodiments, different portions of a same sound guiding hole may be configured to generate guided sound waves having different phases that reduce leaked sound waves having different wavelengths.

In another aspect, the embodiments of the present application disclose a bone conduction speaker, including a housing, a vibration board and a transducer, wherein:

the transducer is configured to generate vibrations and is located inside the housing;

the vibration board is configured to be in contact with skin and pass vibrations;

At least one sound guiding hole may locate in at least one portion on the housing, and preferably, the at least one sound guiding hole may be configured to guide a sound wave inside the housing, resulted from vibrations of the air inside the housing, to the outside of the housing, the guided sound wave interfering with the leaked sound wave and reducing the amplitude thereof.

In some embodiments, the at least one sound guiding hole may locate in the sidewall and/or bottom of the housing.

In some embodiments, preferably, the at least one sound guiding sound hole may locate in the upper portion and/or lower portion of the sidewall of the housing.

In some embodiments, preferably, the sidewall of the housing is cylindrical and there are at least two sound guiding holes located in the sidewall of the housing, which are arranged evenly or unevenly in one or more circles. Alternatively, the housing may have a different shape.

In some embodiments, preferably, the sound guiding holes have different heights along the axial direction of the cylindrical sidewall.

In some embodiments, preferably, there are at least two sound guiding holes located in the bottom of the housing. In some embodiments, the sound guiding holes are distributed evenly or unevenly in one or more circles around the center of the bottom. Alternatively or additionally, one sound guiding hole is located at the center of the bottom of the housing.

In some embodiments, preferably, the sound guiding hole is a perforative hole. In some embodiments, there may be a damping layer at the opening of the sound guiding hole.

In some embodiments, preferably, the guided sound waves through different sound guiding holes and/or different portions of a same sound guiding hole have different phases or a same phase.

In some embodiments, preferably, the damping layer is a tuning paper, a tuning cotton, a nonwoven fabric, a silk, a cotton, a sponge, or a rubber.

In some embodiments, preferably, the shape of a sound guiding hole is circle, ellipse, quadrangle, rectangle, or linear. In some embodiments, the sound guiding holes may have a same shape or different shapes.

In some embodiments, preferably, the transducer includes a magnetic component and a voice coil. Alternatively, the transducer includes piezoelectric ceramic.

The design disclosed in this application utilizes the principles of sound interference, by placing sound guiding holes in the housing, to guide sound wave(s) inside the housing to the outside of the housing, the guided sound wave(s) interfering with the leaked sound wave, which is formed when the housing's vibrations push the air outside the housing. The guided sound wave(s) reduces the amplitude of the leaked sound wave and thus reduces the sound leakage. The design not only reduces sound leakage, but is also easy to implement, doesn't increase the volume or weight of the bone conduction speaker, and barely increase the cost of the product.

The meanings of the mark numbers in the figures are as followed:

110, open housing; 121, vibration board; 122, transducer; 123, linking component; 210, first frame; 220, second frame; 230, moving coil; 240, inner magnetic component; 250, outer magnetic component; 260; vibration board; 270, vibration unit; 10, housing; 11, sidewall; 12, bottom; 21, vibration board; 22, transducer; 23, linking component; 24, elastic component; 30, sound guiding hole.

DETAILED DESCRIPTION

Followings are some further detailed illustrations about this disclosure. The following examples are for illustrative purposes only and should not be interpreted as limitations of the claimed invention. There are a variety of alternative techniques and procedures available to those of ordinary skill in the art, which would similarly permit one to successfully perform the intended invention. In addition, the figures just show the structures relative to this disclosure, not the whole structure.

Figure 1A:
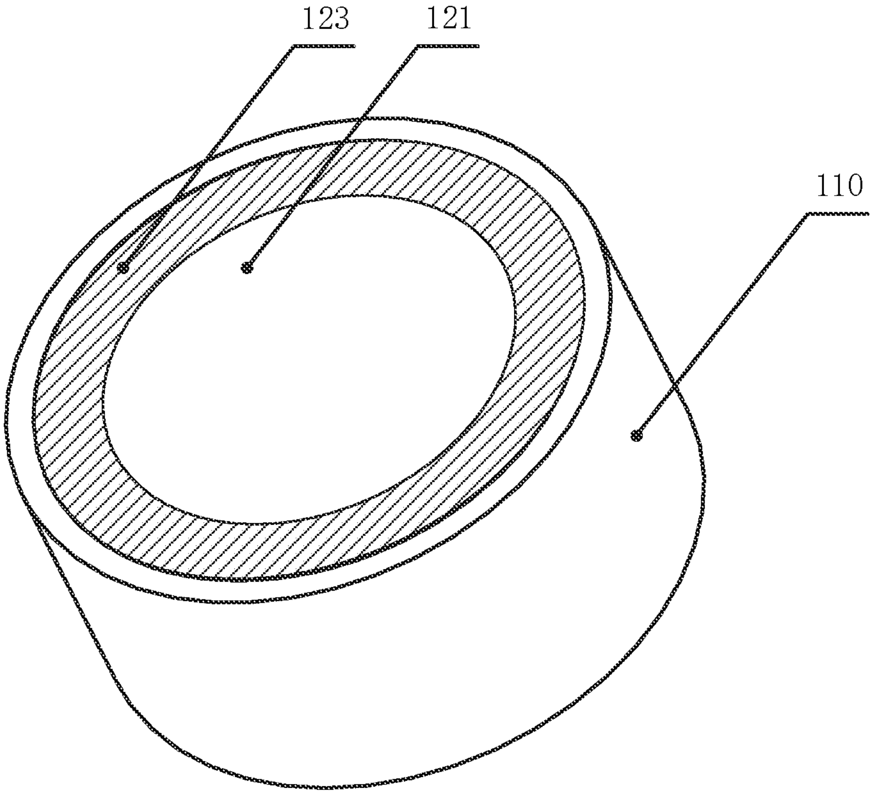
FIGS. 1A and 1B are schematic structures illustrating a bone conduction speaker of prior art.
Figure 1B:
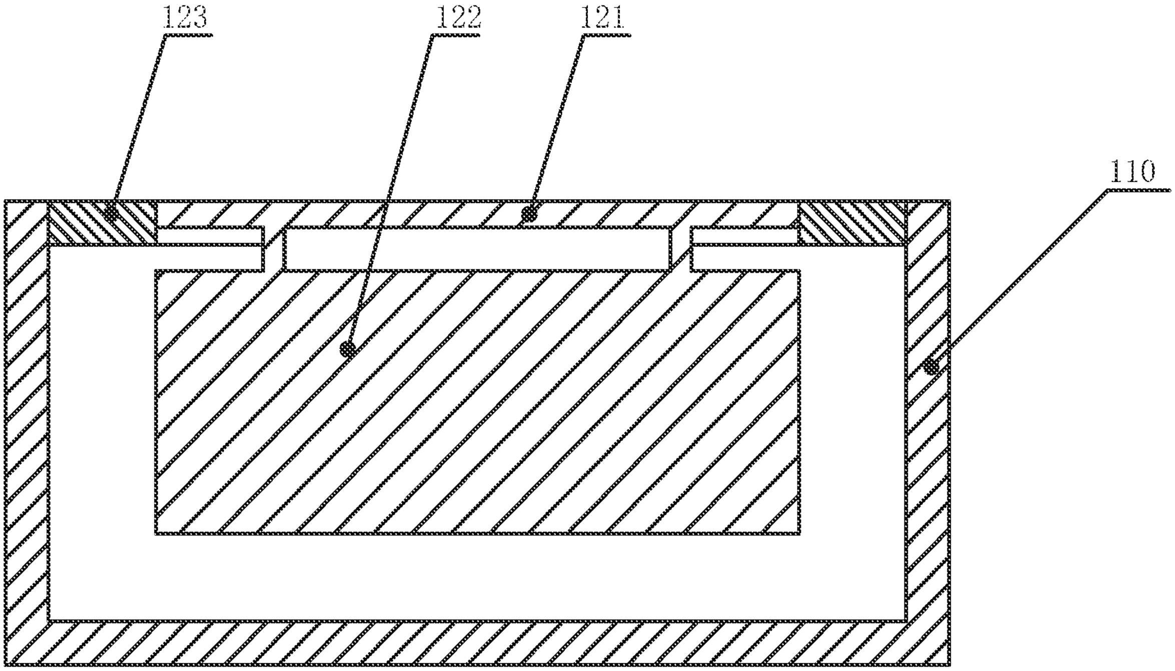
Figure 2:
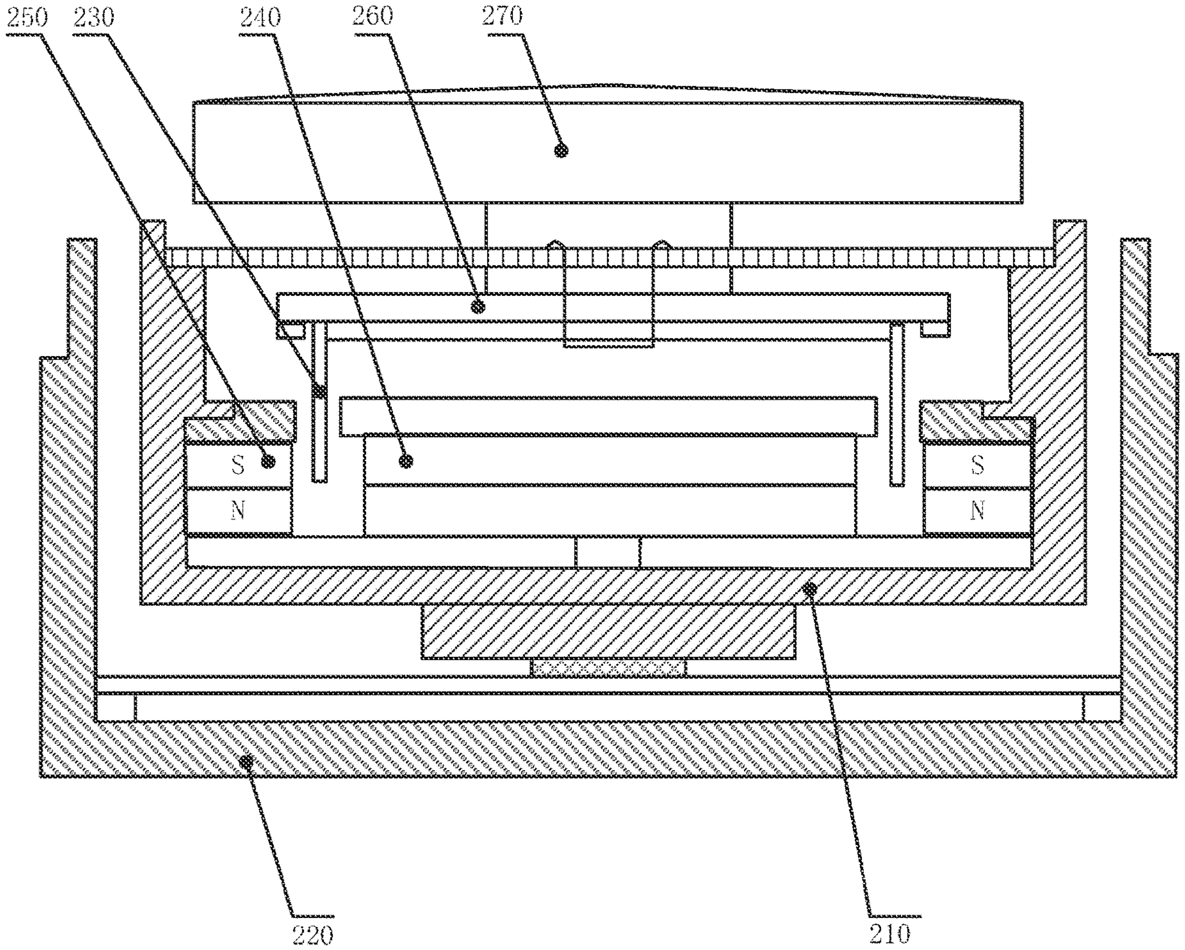
FIG. 2 is a schematic structure illustrating another bone conduction speaker of prior art.
Figure 3:
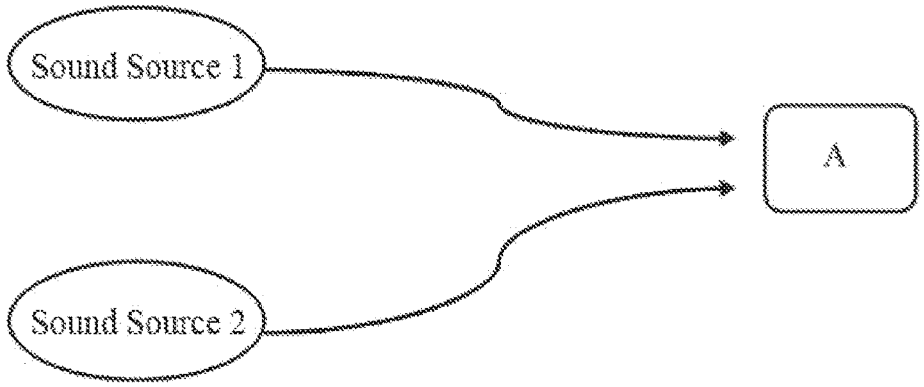
FIG. 3 illustrates the principle of sound interference according to some embodiments of the present disclosure.

To explain the scheme of the embodiments of this disclosure, the design principles of this disclosure will be introduced here. FIG. 3 illustrates the principles of sound interference according to some embodiments of the present disclosure. Two or more sound waves may interfere in the space based on, for example, the frequency and/or amplitude of the waves. Specifically, the amplitudes of the sound waves with the same frequency may be overlaid to generate a strengthened wave or a weakened wave. As shown in FIG. 3, sound source 1 and sound source 2 have the same frequency and locate in different locations in the space. The sound waves generated from these two sound sources may encounter in an arbitrary point A. If the phases of the sound wave 1 and sound wave 2 are the same at point A, the amplitudes of the two sound waves may be added, generating a strengthened sound wave signal at point A; on the other hand, if the phases of the two sound waves are opposite at point A, their amplitudes may be offset, generating a weakened sound wave signal at point A.

This disclosure applies above-noted the principles of sound wave interference to a bone conduction speaker and disclose a bone conduction speaker that can reduce sound leakage.

Embodiment One

Figure 4A:
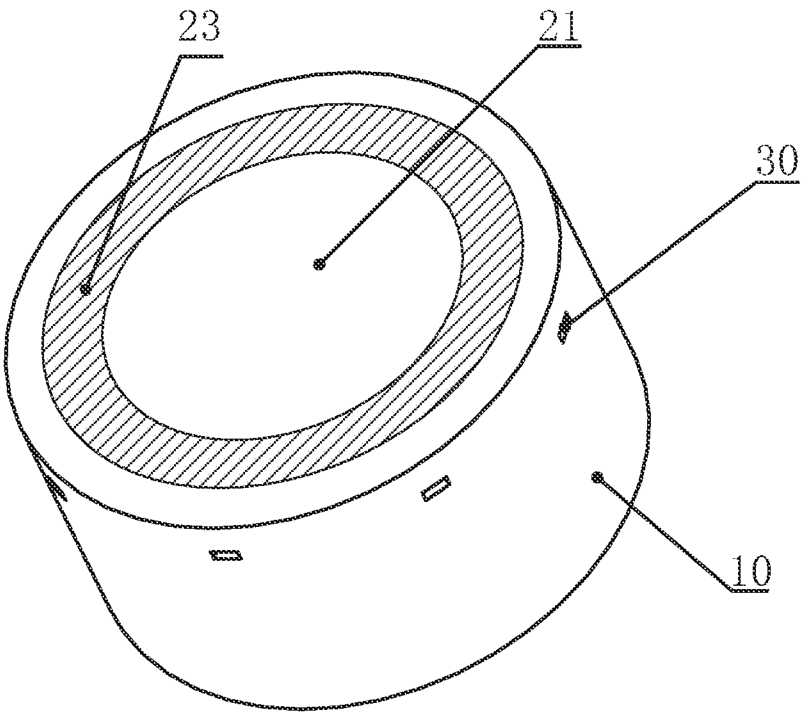
FIGS. 4A and 4B are schematic structures of an exemplary bone conduction speaker according to some embodiments of the present disclosure.
Figure 4B:
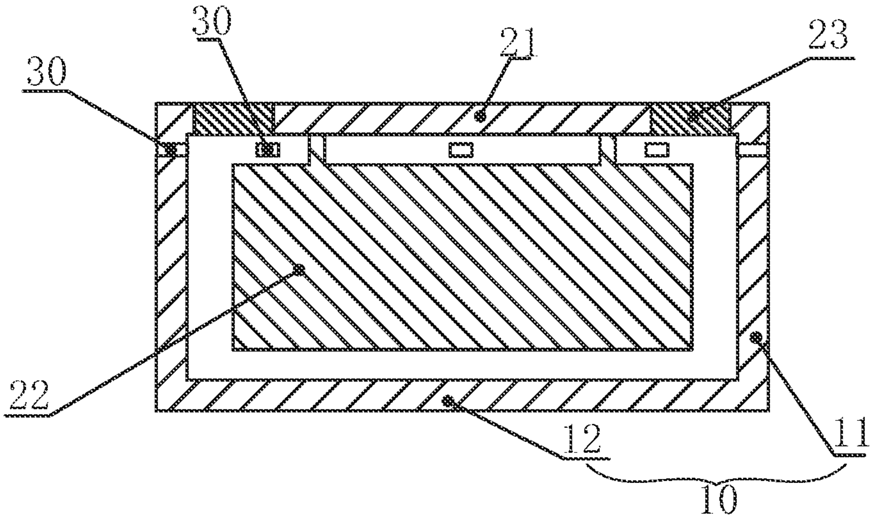

FIGS. 4A and 4B are schematic structures of an exemplary bone conduction speaker. The bone conduction speaker may include a housing 10, a vibration board 21, and a transducer 22. The transducer 22 may be inside the housing 10 and configured to generate vibrations. The housing 10 may have one or more sound guiding holes 30. The sound guiding hole(s) 30 may be configured to guide sound waves inside the housing 10 to the outside of the housing 10. In some embodiments, the guided sound waves may form interference with leaked sound waves generated by the vibrations of the housing 10, so as to reducing the amplitude of the leaked sound. The transducer 22 may be configured to convert an electrical signal to mechanical vibrations. For example, an audio electrical signal may be transmitted into a voice coil that is placed in a magnet, and the electromagnetic interaction may cause the voice coil to vibrate based on the audio electrical signal. As another example, the transducer 22 may include piezoelectric ceramics, shape changes of which may cause vibrations in accordance with electrical signals received.

Furthermore, the vibration board 21 may be connected to the transducer 22 and configured to vibrate along with the transducer 22. The vibration board 21 may stretch out from the opening of the housing 10, and touch the skin of the user and pass vibrations to auditory nerves through human tissues and bones, which in turn enables the user to hear sound. The linking component 23 may reside between the transducer 22 and the housing 10, configured to fix the vibrating transducer 122 inside the housing. The linking component 23 may include one or more separate components, or may be integrated with the transducer 22 or the housing 10. In some embodiments, the linking component 23 is made of an elastic material.

The transducer 22 may drive the vibration board 21 to vibrate. The transducer 22, which resides inside the housing 10, may vibrate. The vibrations of the transducer 22 may drives the air inside the housing 10 to vibrate, producing a sound wave inside the housing 10, which can be referred to as “sound wave inside the housing.” Since the vibration board 21 and the transducer 22 are fixed to the housing 10 via the linking component 23, the vibrations may pass to the housing 10, causing the housing 10 to vibrate synchronously. The vibrations of the housing 10 may generate a leaked sound wave, which spreads outwards as sound leakage.

The sound wave inside the housing and the leaked sound wave are like the two sound sources in FIG. 3. In some embodiments, the sidewall 11 of the housing 10 may have one or more sound guiding holes 30 configured to guide the sound wave inside the housing 10 to the outside. The guided sound wave through the sound guiding hole(s) 30 may interfere with the leaked sound wave generated by the vibrations of the housing 10, and the amplitude of the leaked sound wave may be reduced due to the interference, which may result in a reduced sound leakage. Therefore, the design of this embodiment can solve the sound leakage problem to some extent by making an improvement of setting a sound guiding hole on the housing, and not increasing the volume and weight of the bone conduction speaker.

In some embodiments, one sound guiding hole 30 is set on the upper portion of the sidewall 11. As used herein, the upper portion of the sidewall 11 refers to the portion of the sidewall 11 starting from the top of the sidewall (contacting with the vibration board 21) to about the ⅓ height of the sidewall.

Figure 4C:
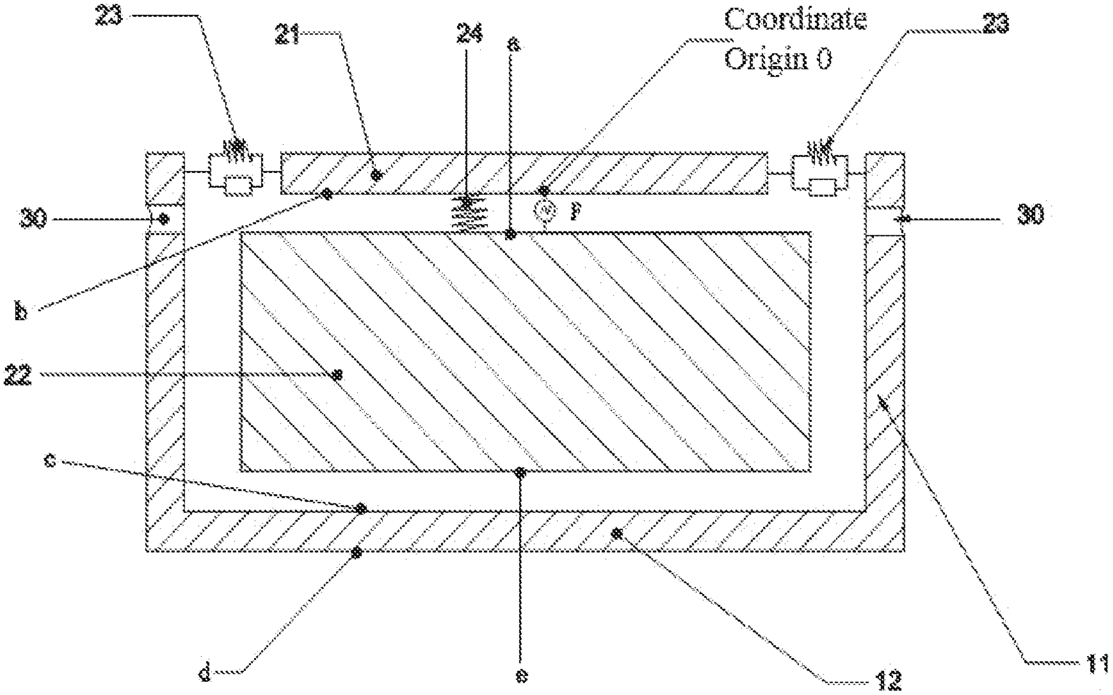
FIG. 4C is a schematic structure of the bone conduction speaker according to some embodiments of the present disclosure.

FIG. 4C is a schematic structure of the bone conduction speaker illustrated in FIGS. 4A-4B. The structure of the bone conduction speaker is further illustrated with mechanics elements illustrated in FIG. 4C. As shown in FIG. 4C, the linking component 23 between the sidewall 11 of the housing 10 and the vibration board 21 may be represented by an elastic element 23 and a damping element in the parallel connection. The linking relationship between the vibration board 21 and the transducer 22 may be represented by an elastic element 24.

Outside the housing 10, the sound leakage reduction is proportional to $$(\int\leftarrow_{S_{hole}} P ds - \iint_{S_{housing}} P_d ds), \tag{1}$$

wherein $S_{hole}$ is the area of the opening of the sound guiding hole 30, $S_{housing}$ is the area of the housing 10 (e.g., the sidewall 11 and the bottom 12) that is not in contact with human face.

The pressure inside the housing may be expressed as $$P = P_a + P_b + P_c + P_e, \tag{2}$$

wherein $P_a$, $P_b$, $P_c$ and $P_e$ are the sound pressures of an arbitrary point inside the housing 10 generated by side a, side b, side c and side e (as illustrated in FIG. 4C), respectively. As used herein, side a refers to the upper surface of the transducer 22 that is close to the vibration board 21, side b refers to the lower surface of the vibration board 21 that is close to the transducer 22, side c refers to the inner upper surface of the bottom 12 that is close to the transducer 22, and side e refers to the lower surface of the transducer 22 that is close to the bottom 12.

The center of the side b, O point, is set as the origin of the space coordinates, and the side b can be set as the z=0 plane, so $P_a$, $P_b$, $P_c$ and $P_e$ may be expressed as follows:

$$P_a(x, y, z) = -j\omega\rho_0 \iint_{S_a} W_a(x'_a, y'_a) \cdot \frac{e^{jkR(x'_a, y'_a)}}{4\pi R(x'_a, y'_a)} dx'_a dy'_a - P_{aR}, \tag{3}$$

$$P_b(x, y, z) = -j\omega\rho_0 \iint_{S_b} W_b(x', y') \cdot \frac{e^{jkR(x', y')}}{4\pi R(x', y')} dx' dy' - P_{bR}, \tag{4}$$

-continued $$P_c(x, y, z) = -j\omega\rho_0 \iint_{S_c} W_c(x'_c, y'_c) \cdot \frac{e^{jkR(x'_c, y'_c)}}{4\pi R(x'_c, y'_c)} dx'_c dy'_c - P_{cR}, \tag{5}$$

$$P_e(x, y, z) = -j\omega\rho_0 \iint_{S_e} W_e(x'_e, y'_e) \cdot \frac{e^{jkR(x'_e, y'_e)}}{4\pi R(x'_e, y'_e)} dx'_e dy'_e - P_{eR}, \tag{6}$$

wherein $$R(x', y') = \sqrt{(x - x'_a)^2 + (y - y'_a)^2 + (z - z_a)^2}$$

is the distance between an observation point (x, y, z) and a point on side b (x', y', 0); $S_a$, $S_b$, $S_c$ and $S_e$ are the areas of side a, side b, side c and side e, respectively;

$$R(x'_a, y'_a) = \sqrt{(x - x'_a)^2 + (y - y'_a)^2 + (z - z_a)^2}$$

is the distance between the observation point (x, y, z) and a point on side a ($x'_a$, $y'_\alpha$, $z_a$);

$$R(x'_c, y'_c) = \sqrt{(x - x'_c)^2 + (y - y'_c)^2 + (z - z_c)^2}$$

is the distance between the observation point (x, y, z) and a point on side c ($x'_c$, $y'_c$, $z_c$);

$$R(x'_e, y'_e) = \sqrt{(x - x'_e)^2 + (y - y'_e)^2 + (z - z_e)^2}$$

is the distance between the observation point (x, y, z) and a point on side e ($x'_e$, $y'_e$, $z_e$);

$k=\omega/u$ (u is the velocity of sound) is wave number, $\rho_0$ is an air density, $\omega$ is an angular frequency of vibration;

$P_{aR}$, $P_{bR}$, $P_{cR}$ and $P_{eR}$ are acoustic resistances of air, which respectively are:

$$P_{aR} = A \cdot \frac{z_a \cdot r + j\omega \cdot z_a \cdot r'}{\varphi} + \delta, \tag{7}$$

$$P_{bR} = A \cdot \frac{z_b \cdot r + j\omega \cdot z_b \cdot r'}{\varphi} + \delta, \tag{8}$$

$$P_{cR} = A \cdot \frac{z_c \cdot r + j\omega \cdot z_c \cdot r'}{\varphi} + \delta, \tag{9}$$

$$P_{eR} = A \cdot \frac{z_e \cdot r + j\omega \cdot z_c \cdot r'}{\varphi} + \delta, \tag{10}$$

wherein r is the acoustic resistance per unit length, r' is the sound quality per unit length, $z_a$ is the distance between the observation point and side a, $Z_b$ is the distance between the observation point and side b, $z_c$ is the distance between the observation point and side c, $z_e$ is the distance between the observation point and side e.

$W_a(x, y)$, $W_b(x, y)$, $W_c(x, y)$, $W_e(x, y)$ and $W_d(x, y)$ are the sound source power per unit area of side a, side b, side c, side e and side d, respectively, which can be derived from following formulas (11):

$$F_e = F_a = F - k_1 \cos \omega t - \iint_{S_a} W_a(x,y)\,\mathrm{dxdy} - \iint_{S_e} W_e(x,y)\,\mathrm{dxdy} - f$$

$$F_b = -F + k_1 \cos \omega t + \iint_{S_b} W_b(x,y)\,\mathrm{dxdy} - \iint_{S_e} W_e(x,y)\,\mathrm{dxdy} - L$$

$$F_c=F_d=F_b-k_2 \cos \omega t-\iint_{S_c} W_c(x,y)\mathrm{d}x\mathrm{d}y-f-\gamma$$

$$F_d=F_b-k_2 \cos \omega t-\iint_{S_d} W_d(x,y)\mathrm{d}x\mathrm{d}y \quad (11)$$

wherein F is the driving force generated by the transducer 22, $F_a$, $F_b$, $F_c$, $F_d$, and $F_e$ are the driving forces of side a, side b, side c, side d and side e, respectively. As used herein, side d is the outside surface of the bottom 12. $S_a$ is the region of side d, f is the viscous resistance formed in the small gap of the sidewalls, and $f=\eta\Delta s(dv/dy)$.

L is the equivalent load on human face when the vibration board acts on the human face, $\gamma$ is the energy dissipated on elastic element 24, $k_1$ and $k_2$ are the elastic coefficients of elastic element 23 and elastic element 24 respectively, $\eta$ is the fluid viscosity coefficient, dv/dy is the velocity gradient of fluid, $\Delta s$ is the cross-section area of a subject (board), A is the amplitude, $\varphi$ is the region of the sound field, and $\delta$ is a high order minimum (which is generated by the incompletely symmetrical shape of the housing);

The sound pressure of an arbitrary point outside the housing, generated by the vibration of the housing 10 is expressed as:

$$P_d = -j\omega\rho_0 \int\int W_d(x_d', y_d') \cdot \frac{e^{jkR(x_d', y_d')}}{4\pi R(x_d', y_d')} dx_d' dy_d', \quad (12)$$

wherein $$R(x_d', y_d') = \sqrt{(x-x_d')^2 + (y-y_d')^2 + (z-z_d)^2}$$

is the distance between the observation point (x, y, z) and a point on side d ($x'_d$, $y'_d$, $z_d$).

$P_a$, $P_b$, $P_c$ and $P_e$ are functions of the position, when we set a hole on an arbitrary position in the housing, if the area of the hole is $S_{hole}$, the sound pressure of the hole is $\iint_{S_{hole}} P\mathrm{d}s$.

In the meanwhile, because the vibration board 21 fits human tissues tightly, the power it gives out is absorbed all by human tissues, so the only side that can push air outside the housing to vibrate is side d, thus forming sound leakage. As described elsewhere, the sound leakage is resulted from the vibrations of the housing 10. For illustrative purposes, the sound pressure generated by the housing 10 may be expressed as $\iint_{S_{housing}} P_d\mathrm{d}s$.

The leaked sound wave and the guided sound wave interference may result in a weakened sound wave, i.e., to make $\iint_{S_{hole}} P\mathrm{d}s$ and $\iint_{S_{housing}} P_d\mathrm{d}s$ have the same value but opposite directions, and the sound leakage may be reduced. In some embodiments, $\iint_{S_{hole}} P\mathrm{d}s$ may be adjusted to reduce the sound leakage. Since $\iint_{S_{hole}} P\mathrm{d}s$ corresponds to information of phases and amplitudes of one or more holes, which further relates to dimensions of the housing of the bone conduction speaker, the vibration frequency of the transducer, the position, shape, quantity and/or size of the sound guiding holes and whether there is damping inside the holes. Thus, the position, shape, and quantity of sound guiding holes, and/or damping materials may be adjusted to reduce sound leakage.

According to the formulas above, a person having ordinary skill in the art would understand that the effectiveness of reducing sound leakage is related to the dimensions of the housing of the bone conduction speaker, the vibration frequency of the transducer, the position, shape, quantity and size of the sound guiding hole(s) and whether there is damping inside the sound guiding hole(s). Accordingly, various configurations, depending on specific needs, may be obtained by choosing specific position where the sound guiding hole(s) is located, the shape and/or quantity of the sound guiding hole(s) as well as the damping material.

Figure 5:
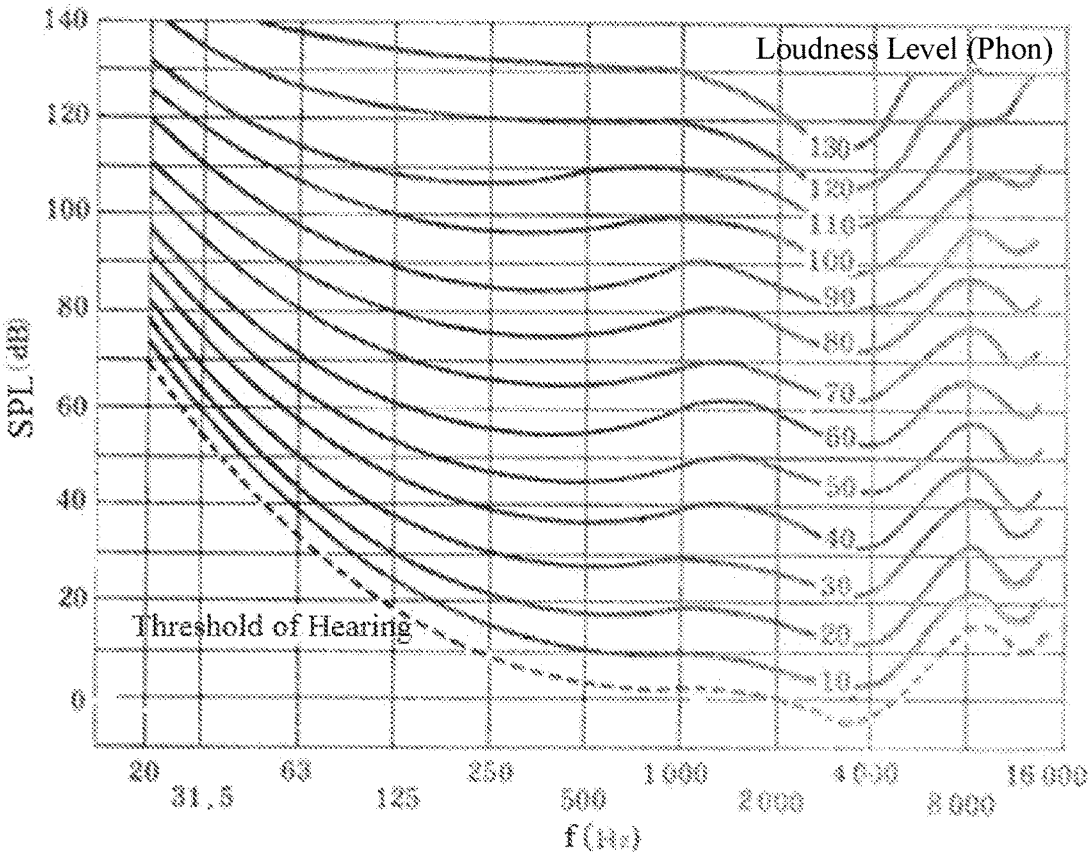
FIG. 5 is a diagram illustrating the equal-loudness contour curves according to some embodiments of the present disclosure.

FIG. 5 is a diagram illustrating the equal-loudness contour curves according to some embodiments of the present disclose. The horizontal coordinate is frequency, while the vertical coordinate is sound pressure level (SPL). As used herein, the SPL refers to the change of atmospheric pressure after being disturbed, i.e., a surplus pressure of the atmospheric pressure, which is equivalent to an atmospheric pressure added to a pressure change caused by the disturbance. As a result, the sound pressure may reflect the amplitude of a sound wave. In FIG. 5, on each curve, sound pressure levels corresponding to different frequencies are different, while the loudness levels felt by human ears are the same. For example, each curve is labeled with a number representing the loudness level of said curve. According to the loudness level curves, when volume (sound pressure amplitude) is lower, human ears are not sensitive to sounds of high or low frequencies; when volume is higher, human ears are more sensitive to sounds of high or low frequencies. Bone conduction speakers may generate sound relating to different frequency ranges, such as 1000 Hz~4000 Hz, or 1000 Hz~4000 Hz, or 1000 Hz~3500 Hz, or 1000 Hz~3000 Hz, or 1500 Hz~3000 Hz. The sound leakage within the above-mentioned frequency ranges may be the sound leakage aimed to be reduced with a priority.

Figure 4D:
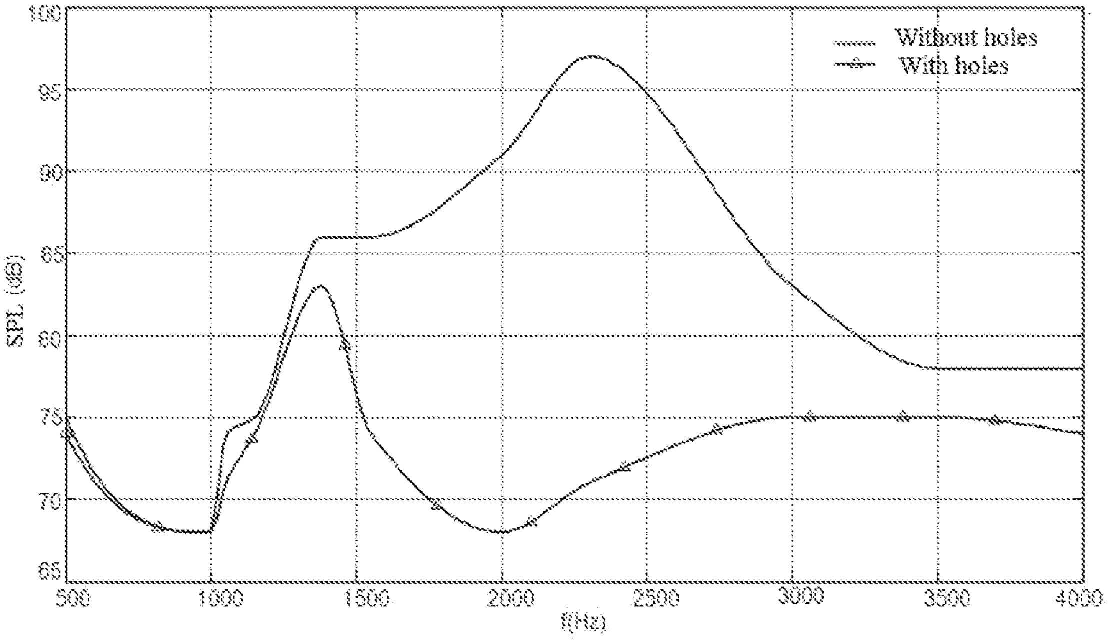
FIG. 4D is a diagram illustrating reduced sound leakage of the bone conduction speaker according to some embodiments of the present disclosure.

FIG. 4D is a diagram illustrating the effect of reduced sound leakage according to some embodiments of the present disclosure, wherein the test results and calculation results are close in the above range. The bone conduction speaker being tested includes a cylindrical housing, which includes a sidewall and a bottom, as described in FIGS. 4A and 4B. The cylindrical housing is in a cylinder shape having a radius of 22 mm, the sidewall height of 14 mm, and a plurality of sound guiding holes being set on the upper portion of the sidewall of the housing. The openings of the sound guiding holes are rectangle. The sound guiding holes are arranged evenly on the sidewall. The target region where the sound leakage is to be reduced is 50 cm away from the outside of the bottom of the housing. The distance of the leaked sound wave spreading to the target region and the distance of the sound wave spreading from the surface of the transducer 20 through the sound guiding holes 30 to the target region have a difference of about 180 degrees in phase. As shown, the leaked sound wave is reduced in the target region dramatically or even be eliminated.

According to the embodiments in this disclosure, the effectiveness of reducing sound leakage after setting sound guiding holes is very obvious. As shown in FIG. 4D, the bone conduction speaker having sound guiding holes greatly reduce the sound leakage compared to the bone conduction speaker without sound guiding holes.

In the tested frequency range, after setting sound guiding holes, the sound leakage is reduced by about 10 dB on average. Specifically, in the frequency range of 1500 Hz~3000 Hz, the sound leakage is reduced by over 10 dB. In the frequency range of 2000 Hz~2500 Hz, the sound leakage is reduced by over 20 dB compared to the scheme without sound guiding holes.

A person having ordinary skill in the art can understand from the above-mentioned formulas that when the dimensions of the bone conduction speaker, target regions to reduce sound leakage and frequencies of sound waves differ, the position, shape and quantity of sound guiding holes also need to adjust accordingly.

For example, in a cylinder housing, according to different needs, a plurality of sound guiding holes may be on the sidewall and/or the bottom of the housing. Preferably, the sound guiding hole may be set on the upper portion and/or lower portion of the sidewall of the housing. The quantity of the sound guiding holes set on the sidewall of the housing is no less than two. Preferably, the sound guiding holes may be arranged evenly or unevenly in one or more circles with respect to the center of the bottom. In some embodiments, the sound guiding holes may be arranged in at least one circle. In some embodiments, one sound guiding hole may be set on the bottom of the housing. In some embodiments, the sound guiding hole may be set at the center of the bottom of the housing.

The quantity of the sound guiding holes can be one or more. Preferably, multiple sound guiding holes may be set symmetrically on the housing. In some embodiments, there are 6-8 circularly arranged sound guiding holes.

The openings (and cross sections) of sound guiding holes may be circle, ellipse, rectangle, or slit. Slit generally means slit along with straight lines, curve lines, or arc lines. Different sound guiding holes in one bone conduction speaker may have same or different shapes.

A person having ordinary skill in the art can understand that, the sidewall of the housing may not be cylindrical, the sound guiding holes can be arranged asymmetrically as needed. Various configurations may be obtained by setting different combinations of the shape, quantity, and position of the sound guiding. Some other embodiments along with the figures are described as follows.

In some embodiments, the leaked sound wave may be generated by a portion of the housing 10. The portion of the housing may be the sidewall 11 of the housing 10 and/or the bottom 12 of the housing 10. Merely by way of example, the leaked sound wave may be generated by the bottom 12 of the housing 10. The guided sound wave output through the sound guiding hole(s) 30 may interfere with the leaked sound wave generated by the portion of the housing 10. The interference may enhance or reduce a sound pressure level of the guided sound wave and/or leaked sound wave in the target region.

In some embodiments, the portion of the housing 10 that generates the leaked sound wave may be regarded as a first sound source (e.g., the sound source 1 illustrated in FIG. 3), and the sound guiding hole(s) 30 or a part thereof may be regarded as a second sound source (e.g., the sound source 2 illustrated in FIG. 3). Merely for illustration purposes, if the size of the sound guiding hole on the housing 10 is small, the sound guiding hole may be approximately regarded as a point sound source. In some embodiments, any number or count of sound guiding holes provided on the housing 10 for outputting sound may be approximated as a single point sound source. Similarly, for simplicity, the portion of the housing 10 that generates the leaked sound wave may also be approximately regarded as a point sound source. In some embodiments, both the first sound source and the second sound source may approximately be regarded as point sound sources (also referred to as two-point sound sources).

Figure 4E:
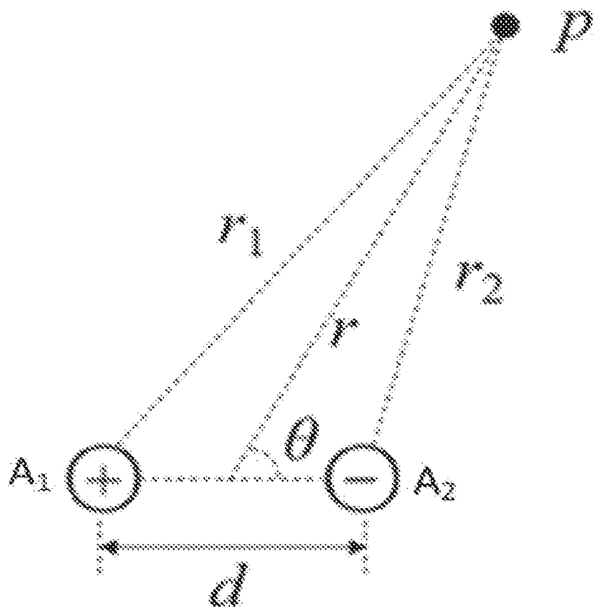
FIG. 4E is a schematic diagram illustrating exemplary two-point sound sources according to some embodiments of the present disclosure.

FIG. 4E is a schematic diagram illustrating exemplary two-point sound sources according to some embodiments of the present disclosure. The sound field pressure p generated by a single point sound source may satisfy Equation (13):

$$p = \frac{j\omega\rho_0}{4\pi r} Q_0 \exp j(\omega t - kr), \tag{13}$$

where ω denotes an angular frequency, $\rho_0$ denotes an air density, r denotes a distance between a target point and the sound source, $Q_0$ denotes a volume velocity of the sound source, and k denotes a wave number. It may be concluded that the magnitude of the sound field pressure of the sound field of the point sound source is inversely proportional to the distance to the point sound source.

It should be noted that, the sound guiding hole(s) for outputting sound as a point sound source may only serve as an explanation of the principle and effect of the present disclosure, and the shape and/or size of the sound guiding hole(s) may not be limited in practical applications. In some embodiments, if the area of the sound guiding hole is large, the sound guiding hole may also be equivalent to a planar sound source. Similarly, if an area of the portion of the housing 10 that generates the leaked sound wave is large (e.g., the portion of the housing 10 is a vibration surface or a sound radiation surface), the portion of the housing 10 may also be equivalent to a planar sound source. For those skilled in the art, without creative activities, it may be known that sounds generated by structures such as sound guiding holes, vibration surfaces, and sound radiation surfaces may be equivalent to point sound sources at the spatial scale discussed in the present disclosure, and may have consistent sound propagation characteristics and the same mathematical description method. Further, for those skilled in the art, without creative activities, it may be known that the acoustic effect achieved by the two-point sound sources may also be implemented by alternative acoustic structures. According to actual situations, the alternative acoustic structures may be modified and/or combined discretionarily, and the same acoustic output effect may be achieved.

The two-point sound sources may be formed such that the guided sound wave output from the sound guiding hole(s) may interfere with the leaked sound wave generated by the portion of the housing 10. The interference may reduce a sound pressure level of the leaked sound wave in the surrounding environment (e.g., the target region). For convenience, the sound waves output from an acoustic output device (e.g., the bone conduction speaker) to the surrounding environment may be referred to as far-field leakage since it may be heard by others in the environment. The sound waves output from the acoustic output device to the ears of the user may also be referred to as near-field sound since a distance between the bone conduction speaker and the user may be relatively short. In some embodiments, the sound waves output from the two-point sound sources may have a same frequency or frequency range (e.g., 800 Hz, 1000 Hz, 1500 Hz, 3000 Hz, etc.). In some embodiments, the sound waves output from the two-point sound sources may have a certain phase difference. In some embodiments, the sound guiding hole includes a damping layer. The damping layer may be, for example, a tuning paper, a tuning cotton, a nonwoven fabric, a silk, a cotton, a sponge, or a rubber. The damping layer may be configured to adjust the phase of the guided sound wave in the target region. The acoustic output device described herein may include a bone conduction speaker or an air conduction speaker. For example, a portion of the housing (e.g., the bottom of the housing) of the bone conduction speaker may be treated as one of the two-point sound sources, and at least one sound guiding holes of the bone conduction speaker may be treated as the other one of the two-point sound sources. As another example, one sound guiding hole of an air conduction speaker may be treated as one of the two-point sound sources, and another sound guiding hole of the air conduction speaker may be treated as the other one of the two-point sound sources. It should be noted that, although the construction of two-point sound sources may be different in bone conduction speaker and air conduction speaker, the principles of the interference between the various constructed two-point sound sources are the same. Thus, the equivalence of the two-point sound sources in a bone conduction speaker disclosed elsewhere in the present disclosure is also applicable for an air conduction speaker.

In some embodiments, when the position and phase difference of the two-point sound sources meet certain conditions, the acoustic output device may output different sound effects in the near field (for example, the position of the user's ear) and the far field. For example, if the phases of the point sound sources corresponding to the portion of the housing 10 and the sound guiding hole(s) are opposite, that is, an absolute value of the phase difference between the two-point sound sources is 180 degrees, the far-field leakage may be reduced according to the principle of reversed phase cancellation.

In some embodiments, the interference between the guided sound wave and the leaked sound wave at a specific frequency may relate to a distance between the sound guiding hole(s) and the portion of the housing 10. For example, if the sound guiding hole(s) are set at the upper portion of the sidewall of the housing 10 (as illustrated in FIG. 4A), the distance between the sound guiding hole(s) and the portion of the housing 10 may be large. Correspondingly, the frequencies of sound waves generated by such two-point sound sources may be in a mid-low frequency range (e.g., 1500-2000 Hz, 1500-2500 Hz, etc.). Referring to FIG. 4D, the interference may reduce the sound pressure level of the leaked sound wave in the mid-low frequency range (i.e., the sound leakage is low).

Merely by way of example, the low frequency range may refer to frequencies in a range below a first frequency threshold. The high frequency range may refer to frequencies in a range exceed a second frequency threshold. The first frequency threshold may be lower than the second frequency threshold. The mid-low frequency range may refer to frequencies in a range between the first frequency threshold and the second frequency threshold. For example, the first frequency threshold may be 1000 Hz, and the second frequency threshold may be 3000 Hz. The low frequency range may refer to frequencies in a range below 1000 Hz, the high frequency range may refer to frequencies in a range above 3000 Hz, and the mid-low frequency range may refer to frequencies in a range of 1000-2000 Hz, 1500-2500 Hz, etc. In some embodiments, a middle frequency range, a mid-high frequency range may also be determined between the first frequency threshold and the second frequency threshold. In some embodiments, the mid-low frequency range and the low frequency range may partially overlap. The mid-high frequency range and the high frequency range may partially overlap. For example, the mid-high frequency range may refer to frequencies in a range above 3000 Hz, and the mid-low frequency range may refer to frequencies in a range of 2800-3500 Hz. It should be noted that the low frequency range, the mid-low frequency range, the middle frequency range, the mid-high frequency range, and/or the high frequency range may be set flexibly according to different situations, and are not limited herein.

In some embodiments, the frequencies of the guided sound wave and the leaked sound wave may be set in a low frequency range (e.g., below 800 Hz, below 1200 Hz, etc.). In some embodiments, the amplitudes of the sound waves generated by the two-point sound sources may be set to be different in the low frequency range. For example, the amplitude of the guided sound wave may be smaller than the amplitude of the leaked sound wave. In this case, the interference may not reduce sound pressure of the near-field sound in the low-frequency range. The sound pressure of the near-field sound may be improved in the low-frequency range. The volume of the sound heard by the user may be improved.

In some embodiments, the amplitude of the guided sound wave may be adjusted by setting an acoustic resistance structure in the sound guiding hole(s) 30. The material of the acoustic resistance structure disposed in the sound guiding hole 30 may include, but not limited to, plastics (e.g., high-molecular polyethylene, blown nylon, engineering plastics, etc.), cotton, nylon, fiber (e.g., glass fiber, carbon fiber, boron fiber, graphite fiber, graphene fiber, silicon carbide fiber, or aramid fiber), other single or composite materials, other organic and/or inorganic materials, etc. The thickness of the acoustic resistance structure may be 0.005 mm, 0.01 mm, 0.02 mm, 0.5 mm, 1 mm, 2 mm, etc. The structure of the acoustic resistance structure may be in a shape adapted to the shape of the sound guiding hole. For example, the acoustic resistance structure may have a shape of a cylinder, a sphere, a cubic, etc. In some embodiments, the materials, thickness, and structures of the acoustic resistance structure may be modified and/or combined to obtain a desirable acoustic resistance structure. In some embodiments, the acoustic resistance structure may be implemented by the damping layer.

In some embodiments, the amplitude of the guided sound wave output from the sound guiding hole may be relatively low (e.g., zero or almost zero). The difference between the guided sound wave and the leaked sound wave may be maximized, thus achieving a relatively large sound pressure in the near field. In this case, the sound leakage of the acoustic output device having sound guiding holes may be almost the same as the sound leakage of the acoustic output device without sound guiding holes in the low frequency range (e.g., as shown in FIG. 4D).

Embodiment Two

Figure 6:
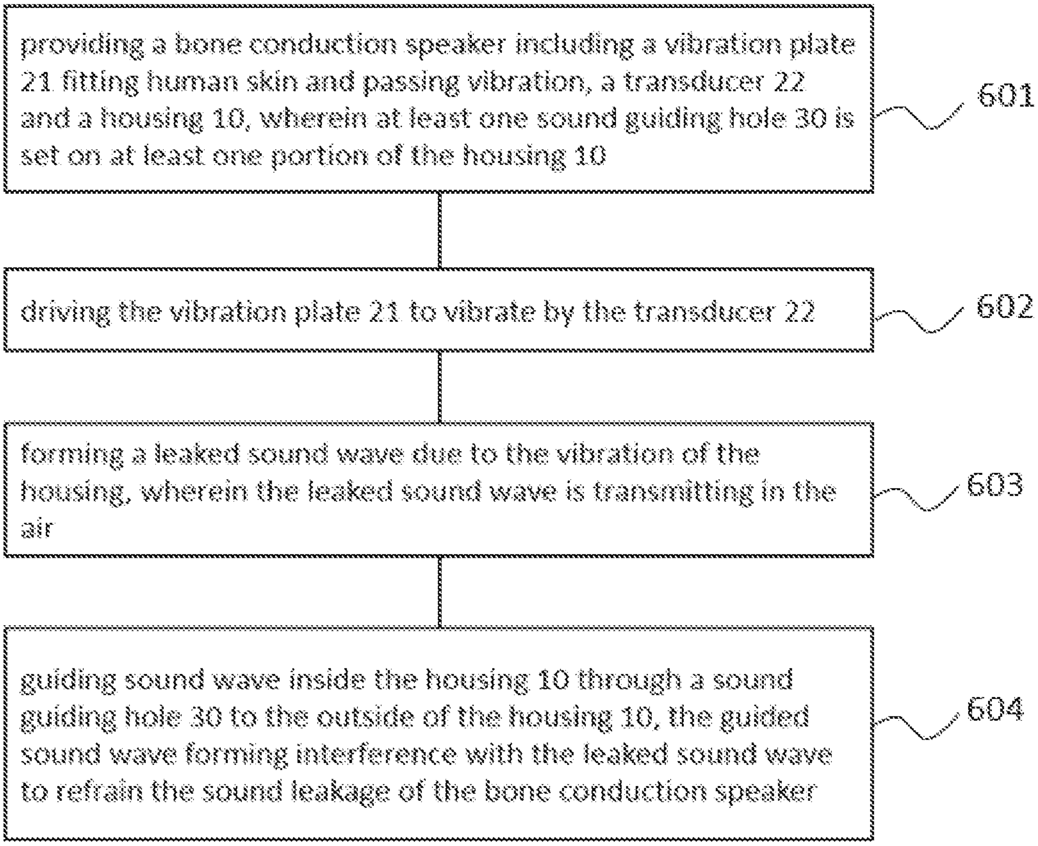
FIG. 6 is a flow chart of an exemplary method of reducing sound leakage of a bone conduction speaker according to some embodiments of the present disclosure.

FIG. 6 is a flowchart of an exemplary method of reducing sound leakage of a bone conduction speaker according to some embodiments of the present disclosure. At 601, a bone conduction speaker including a vibration plate 21 touching human skin and passing vibrations, a transducer 22, and a housing 10 is provided. At least one sound guiding hole 30 is arranged on the housing 10. At 602, the vibration plate 21 is driven by the transducer 22, causing the vibration 21 to vibrate. At 603, a leaked sound wave due to the vibrations of the housing is formed, wherein the leaked sound wave transmits in the air. At 604, a guided sound wave passing through the at least one sound guiding hole 30 from the inside to the outside of the housing 10. The guided sound wave interferes with the leaked sound wave, reducing the sound leakage of the bone conduction speaker.

The sound guiding holes 30 are preferably set at different positions of the housing 10.

The effectiveness of reducing sound leakage may be determined by the formulas and method as described above, based on which the positions of sound guiding holes may be determined.

A damping layer is preferably set in a sound guiding hole 30 to adjust the phase and amplitude of the sound wave transmitted through the sound guiding hole 30.

In some embodiments, different sound guiding holes may generate different sound waves having a same phase to reduce the leaked sound wave having the same wavelength. In some embodiments, different sound guiding holes may generate different sound waves having different phases to reduce the leaked sound waves having different wavelengths.

In some embodiments, different portions of a sound guiding hole 30 may be configured to generate sound waves having a same phase to reduce the leaked sound waves with the same wavelength. In some embodiments, different portions of a sound guiding hole 30 may be configured to generate sound waves having different phases to reduce the leaked sound waves with different wavelengths.

Additionally, the sound wave inside the housing may be processed to basically have the same value but opposite phases with the leaked sound wave, so that the sound leakage may be further reduced.

Embodiment Three

Figure 7A:
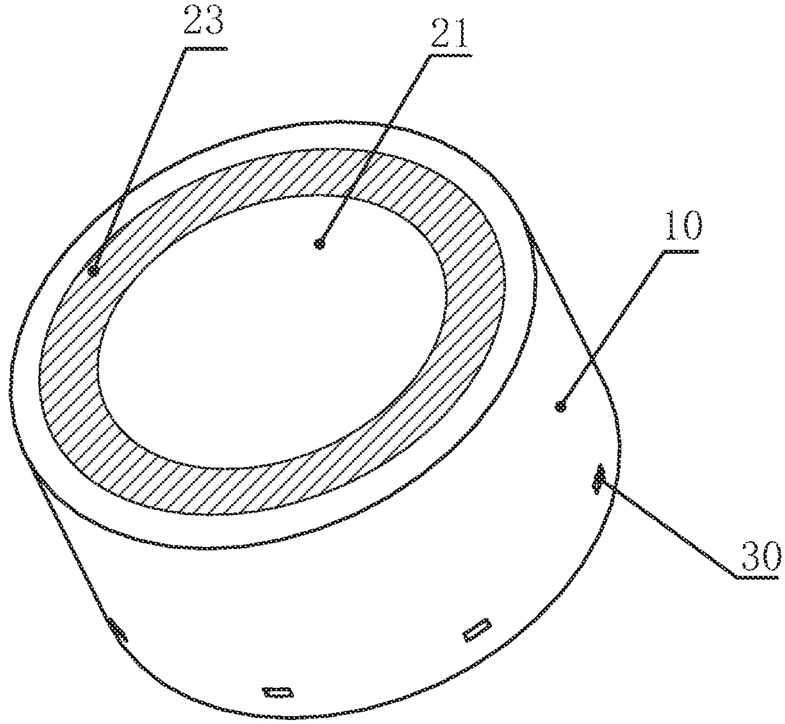
FIGS. 7A and 7B are schematic structures of an exemplary bone conduction speaker according to some embodiments of the present disclosure.
Figure 7B:
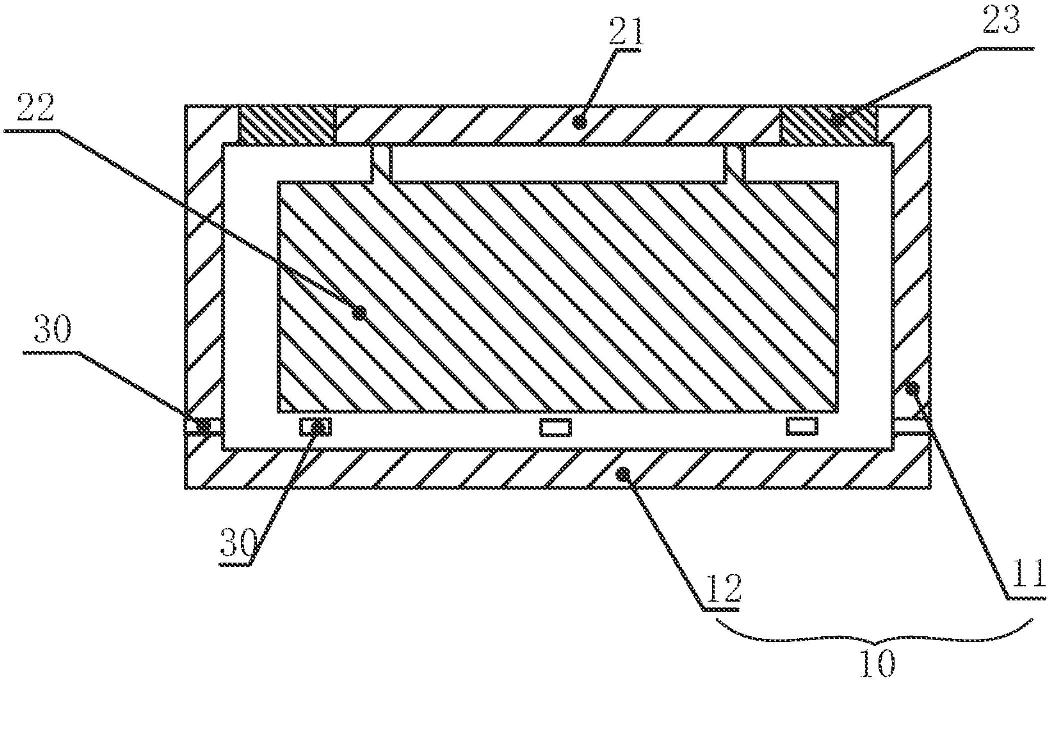

FIGS. 7A and 7B are schematic structures illustrating an exemplary bone conduction speaker according to some embodiments of the present disclosure. The bone conduction speaker may include an open housing 10, a vibration board 21, and a transducer 22. The housing 10 may cylindrical and have a sidewall and a bottom. A plurality of sound guiding holes 30 may be arranged on the lower portion of the sidewall (i.e., from about the ⅔ height of the sidewall to the bottom). The quantity of the sound guiding holes 30 may be 8, the openings of the sound guiding holes 30 may be rectangle. The sound guiding holes 30 may be arranged evenly or evenly in one or more circles on the sidewall of the housing 10.

In the embodiment, the transducer 22 is preferably implemented based on the principle of electromagnetic transduction. The transducer may include components such as magnetizer, voice coil, and etc., and the components may locate inside the housing and may generate synchronous vibrations with a same frequency.

Figure 7C:
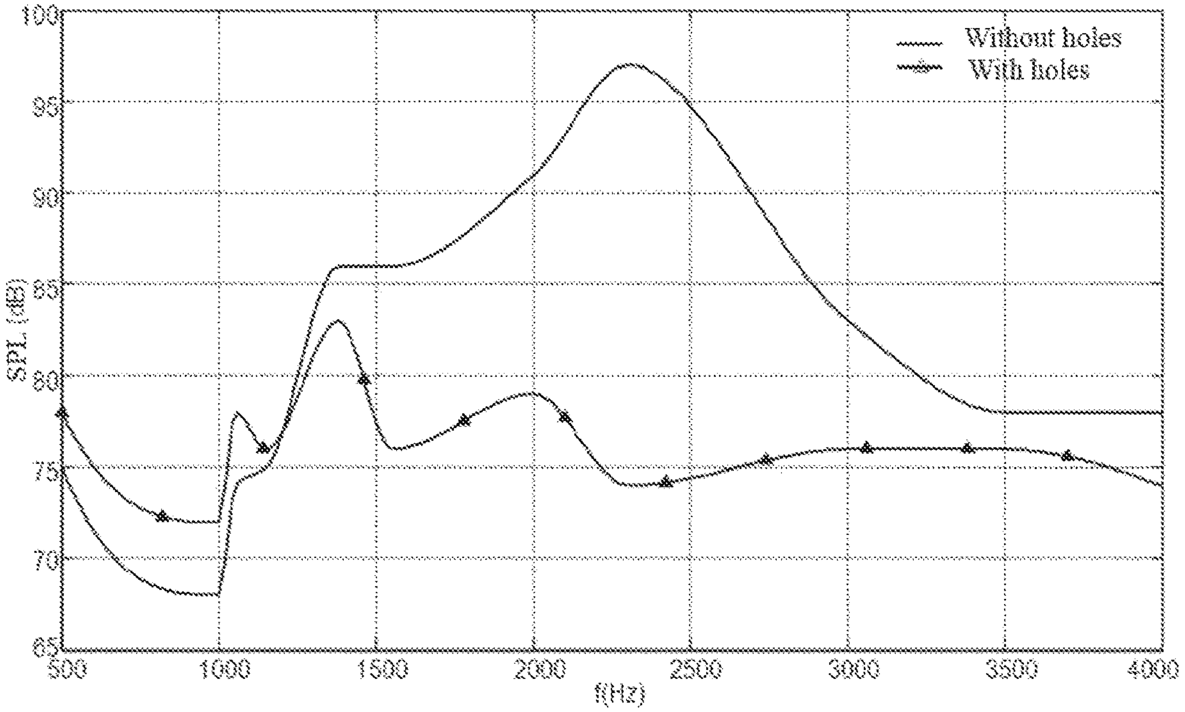
FIG. 7C is a diagram illustrating reduced sound leakage of a bone conduction speaker according to some embodiments of the present disclosure.

FIG. 7C is a diagram illustrating reduced sound leakage according to some embodiments of the present disclosure. In the frequency range of 1400 Hz~4000 Hz, the sound leakage is reduced by more than 5 dB, and in the frequency range of 2250 Hz~2500 Hz, the sound leakage is reduced by more than 20 dB.

In some embodiments, the sound guiding hole(s) at the lower portion of the sidewall of the housing 10 may also be approximately regarded as a point sound source. In some embodiments, the sound guiding hole(s) at the lower portion of the sidewall of the housing 10 and the portion of the housing 10 that generates the leaked sound wave may constitute two-point sound sources. The two-point sound sources may be formed such that the guided sound wave output from the sound guiding hole(s) at the lower portion of the sidewall of the housing 10 may interfere with the leaked sound wave generated by the portion of the housing 10. The interference may reduce a sound pressure level of the leaked sound wave in the surrounding environment (e.g., the target region) at a specific frequency or frequency range.

In some embodiments, the sound waves output from the two-point sound sources may have a same frequency or frequency range (e.g., 1000 Hz, 2500 Hz, 3000 Hz, etc.). In some embodiments, the sound waves output from the first two-point sound sources may have a certain phase difference. In this case, the interference between the sound waves generated by the first two-point sound sources may reduce a sound pressure level of the leaked sound wave in the target region. When the position and phase difference of the first two-point sound sources meet certain conditions, the acoustic output device may output different sound effects in the near field (for example, the position of the user's ear) and the far field. For example, if the phases of the first two-point sound sources are opposite, that is, an absolute value of the phase difference between the first two-point sound sources is 180 degrees, the far-field leakage may be reduced.

In some embodiments, the interference between the guided sound wave and the leaked sound wave may relate to frequencies of the guided sound wave and the leaked sound wave and/or a distance between the sound guiding hole(s) and the portion of the housing 10. For example, if the sound guiding hole(s) are set at the lower portion of the sidewall of the housing 10 (as illustrated in FIG. 7A), the distance between the sound guiding hole(s) and the portion of the housing 10 may be small. Correspondingly, the frequencies of sound waves generated by such two-point sound sources may be in a high frequency range (e.g., above 3000 Hz, above 3500 Hz, etc.). Referring to FIG. 7C, the interference may reduce the sound pressure level of the leaked sound wave in the high frequency range.

Embodiment Four

Figure 8A:
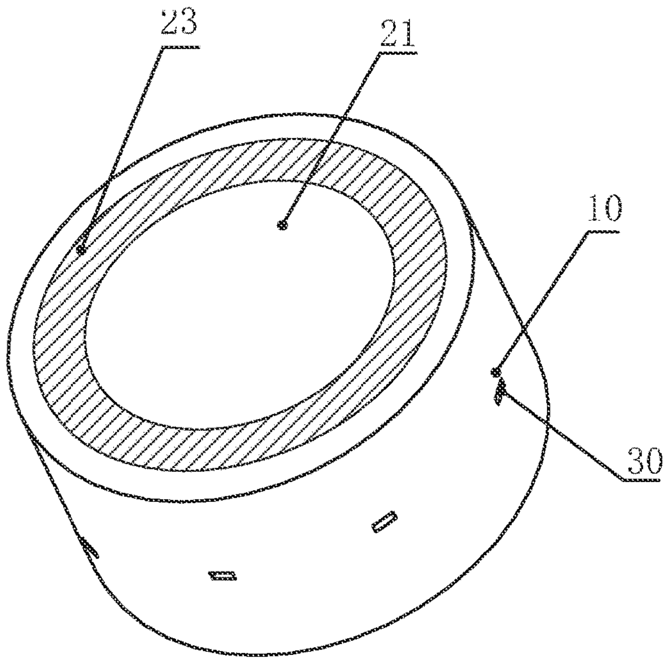
FIGS. 8A and 8B are schematic structure of an exemplary bone conduction speaker according to some embodiments of the present disclosure.
Figure 8B:
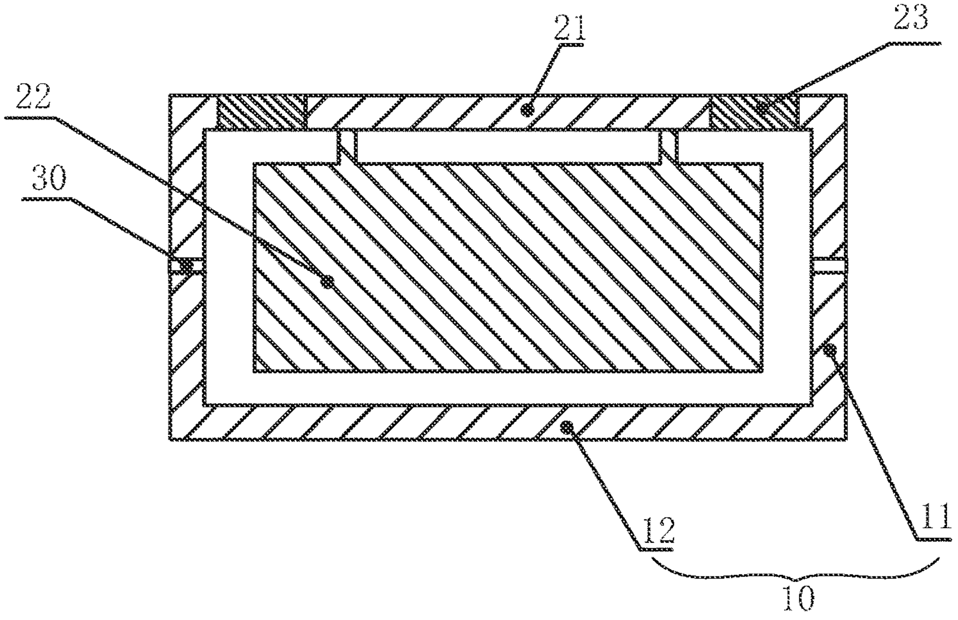

FIGS. 8A and 8B are schematic structures illustrating an exemplary bone conduction speaker according to some embodiments of the present disclosure. The bone conduction speaker may include an open housing 10, a vibration board 21, and a transducer 22. The housing 10 is cylindrical and have a sidewall and a bottom. The sound guiding holes 30 may be arranged on the central portion of the sidewall of the housing (i.e., from about the ⅓ height of the sidewall to the ⅔ height of the sidewall). The quantity of the sound guiding holes 30 may be 8, and the openings (and cross sections) of the sound guiding hole 30 may be rectangle. The sound guiding holes 30 may be arranged evenly or unevenly in one or more circles on the sidewall of the housing 10.

In the embodiment, the transducer 21 may be implemented preferably based on the principle of electromagnetic transduction. The transducer 21 may include components such as magnetizer, voice coil, etc., which may be placed inside the housing and may generate synchronous vibrations with the same frequency.

Figure 8C:
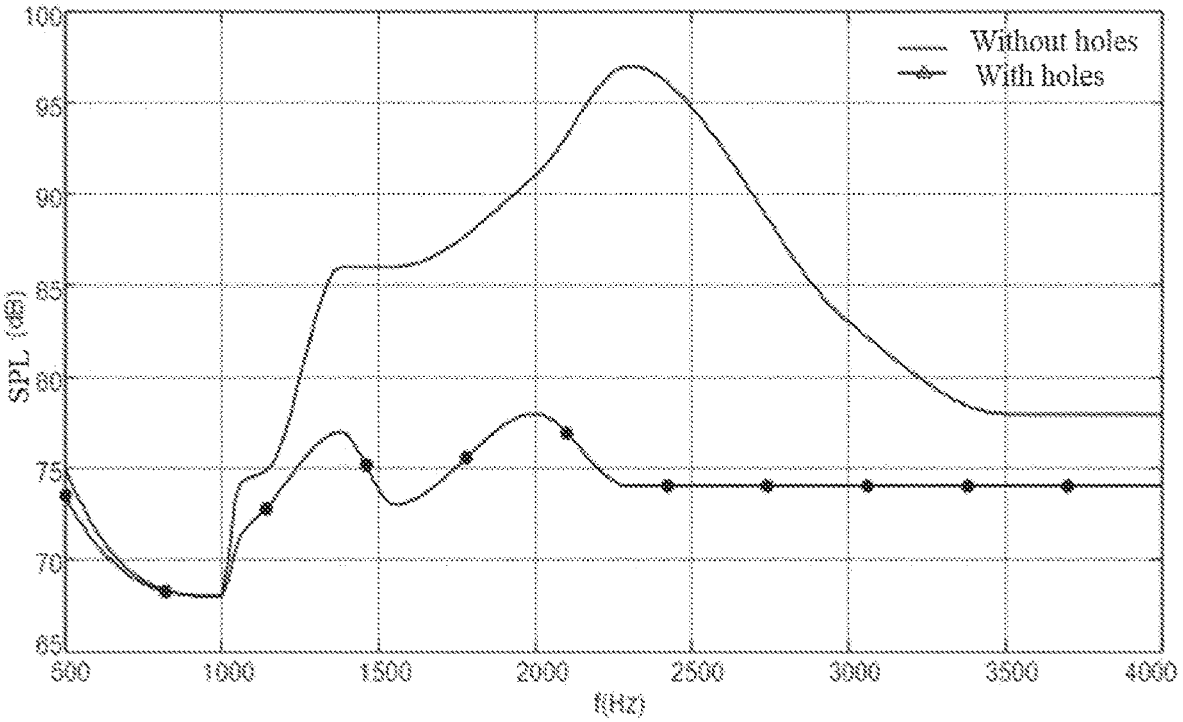
FIG. 8C is a diagram illustrating reduced sound leakage of a bone conduction speaker according to some embodiments of the present disclosure.

FIG. 8C is a diagram illustrating reduced sound leakage. In the frequency range of 1000 Hz~4000 Hz, the effectiveness of reducing sound leakage is great. For example, in the frequency range of 1400 Hz~2900 Hz, the sound leakage is reduced by more than 10 dB; in the frequency range of 2200 Hz~2500 Hz, the sound leakage is reduced by more than 20 dB.

It's illustrated that the effectiveness of reduced sound leakage can be adjusted by changing the positions of the sound guiding holes, while keeping other parameters relating to the sound guiding holes unchanged.

Embodiment Five

Figure 9A:
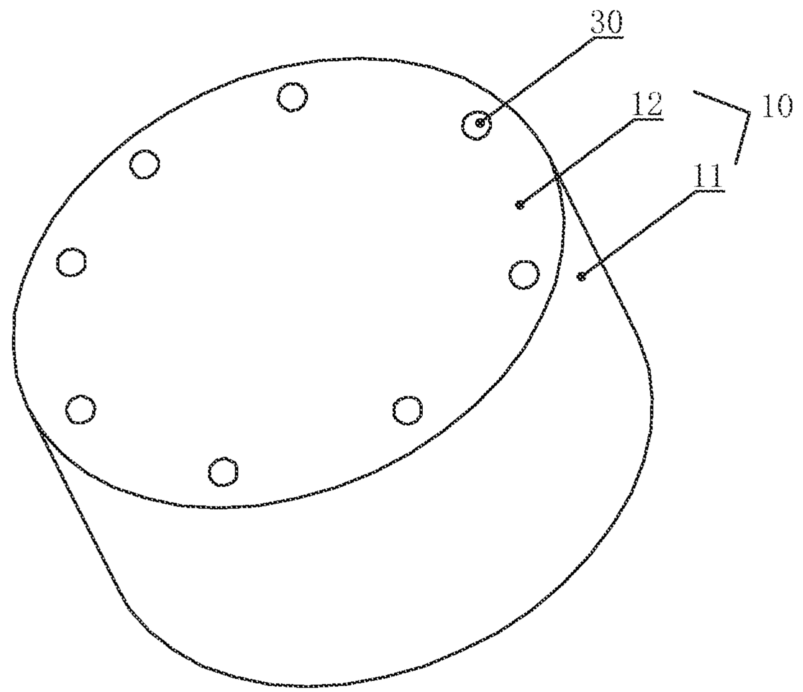
FIGS. 9A and 9B are schematic structures of an exemplary bone conduction speaker according to some embodiments of the present disclosure.
Figure 9B:
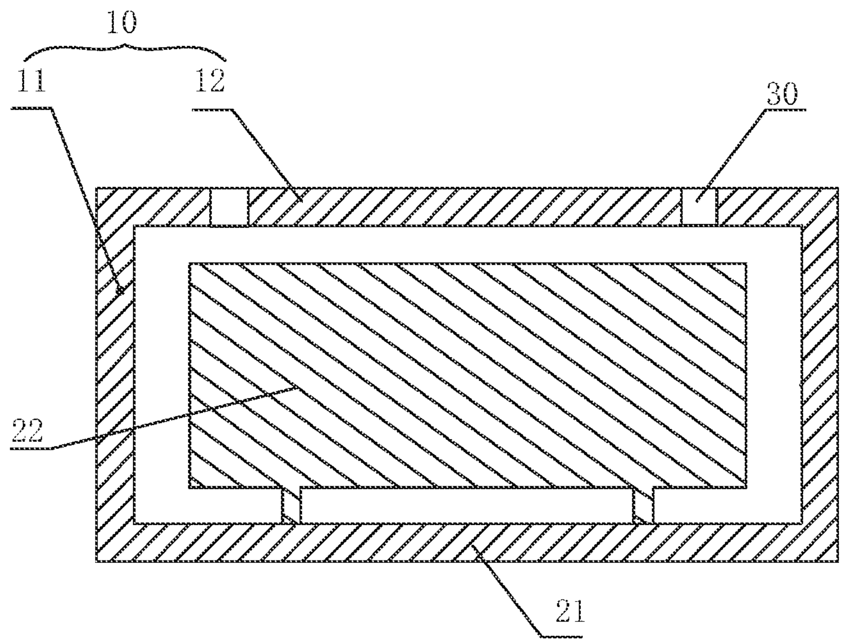

FIGS. 9A and 9B are schematic structures of an exemplary bone conduction speaker according to some embodiments of the present disclosure. The bone conduction speaker may include an open housing 10, a vibration board 21 and a transducer 22. The housing 10 is cylindrical, with a sidewall and a bottom. One or more perforative sound guiding holes 30 may be along the circumference of the bottom. In some embodiments, there may be 8 sound guiding holes 30 arranged evenly of unevenly in one or more circles on the bottom of the housing 10. In some embodiments, the shape of one or more of the sound guiding holes 30 may be rectangle.

In the embodiment, the transducer 21 may be implemented preferably based on the principle of electromagnetic transduction. The transducer 21 may include components such as magnetizer, voice coil, etc., which may be placed inside the housing and may generate synchronous vibration with the same frequency.

Figure 9C:
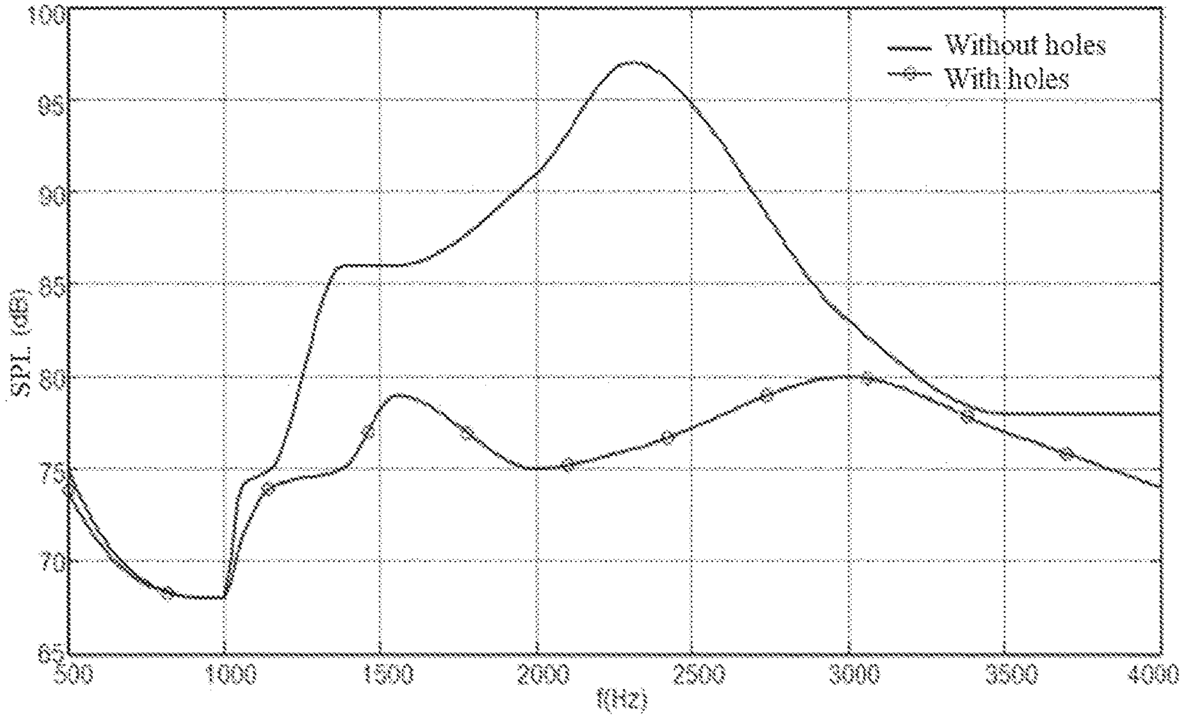
FIG. 9C is a diagram illustrating reduced sound leakage of a bone conduction speaker according to some embodiments of the present disclosure.

FIG. 9C is a diagram illustrating the effect of reduced sound leakage. In the frequency range of 1000 Hz~3000 Hz, the effectiveness of reducing sound leakage is outstanding. For example, in the frequency range of 1700 Hz~2700 Hz, the sound leakage is reduced by more than 10 dB; in the frequency range of 2200 Hz~2400 Hz, the sound leakage is reduced by more than 20 dB.

Embodiment Six

Figure 10A:
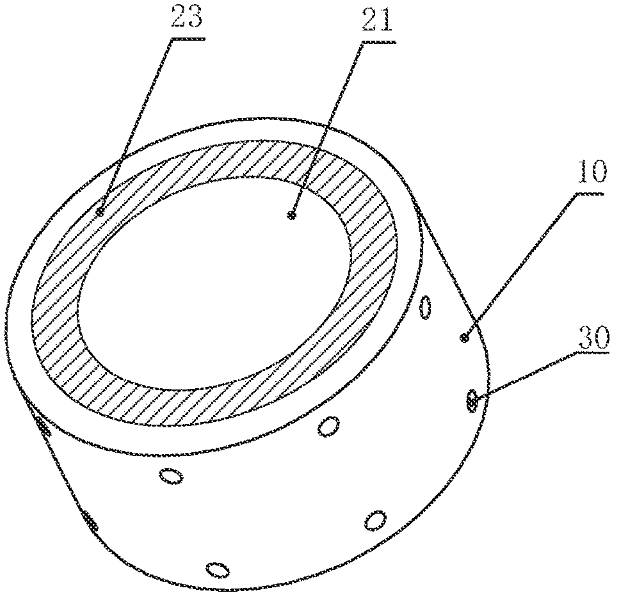
FIGS. 10A and 10B are schematic structures of an exemplary bone conduction speaker according to some embodiments of the present disclosure.
Figure 10B:
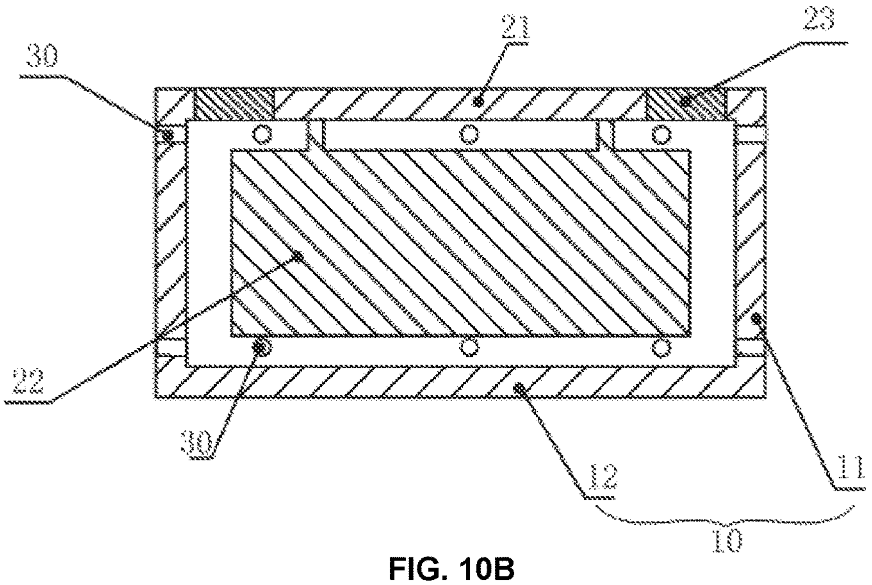

FIGS. 10A and 10B are schematic structures of an exemplary bone conduction speaker according to some embodiments of the present disclosure. The bone conduction speaker may include an open housing 10, a vibration board 21 and a transducer 22. One or more perforative sound guiding holes 30 may be arranged on both upper and lower portions of the sidewall of the housing 10. The sound guiding holes 30 may be arranged evenly or unevenly in one or more circles on the upper and lower portions of the sidewall of the housing 10. In some embodiments, the quantity of sound guiding holes 30 in every circle may be 8, and the upper portion sound guiding holes and the lower portion sound guiding holes may be symmetrical about the central cross section of the housing 10. In some embodiments, the shape of the sound guiding hole 30 may be circle.

The shape of the sound guiding holes on the upper portion and the shape of the sound guiding holes on the lower portion may be different; One or more damping layers may be arranged in the sound guiding holes to reduce leaked sound waves of the same wave length (or frequency), or to reduce leaked sound waves of different wave lengths.

Figure 10C:
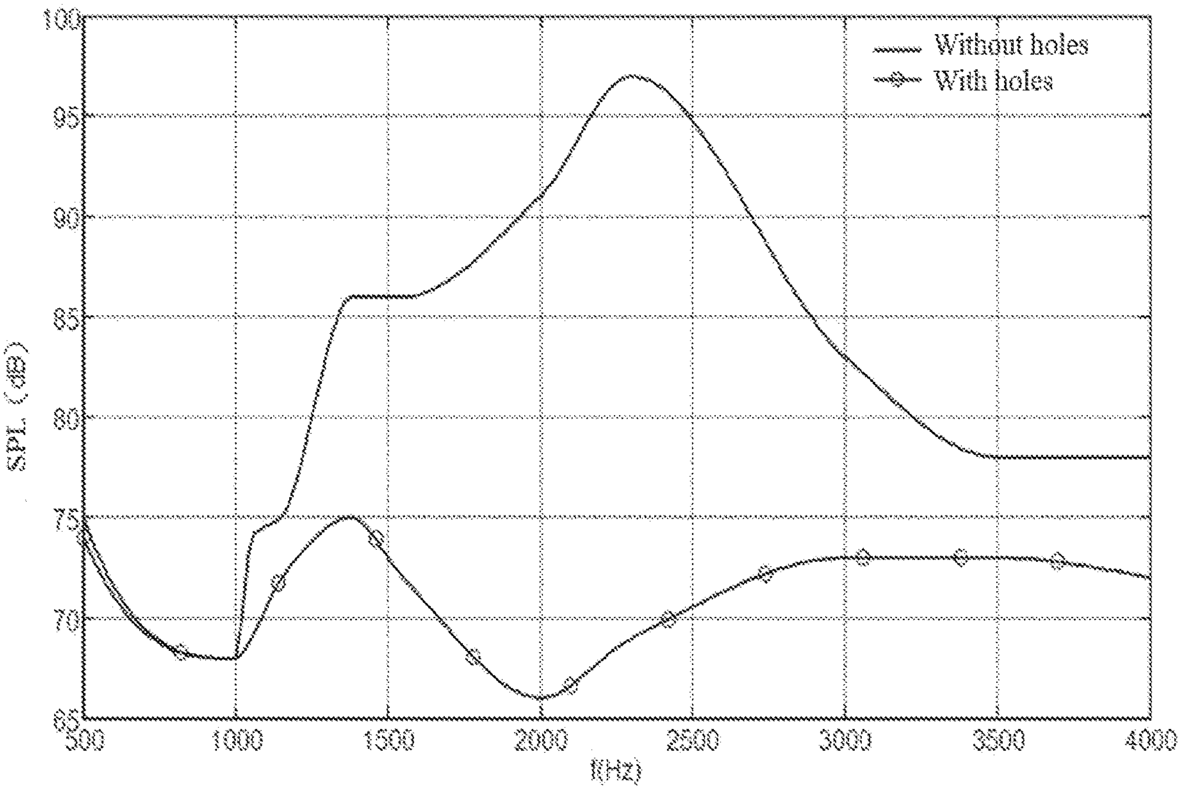
FIG. 10C is a diagram illustrating reduced sound leakage of a bone conduction speaker according to some embodiments of the present disclosure.

FIG. 10C is a diagram illustrating the effect of reducing sound leakage according to some embodiments of the present disclosure. In the frequency range of 1000 Hz~4000 Hz, the effectiveness of reducing sound leakage is outstanding. For example, in the frequency range of 1600 Hz~2700 Hz, the sound leakage is reduced by more than 15 dB; in the frequency range of 2000 Hz~2500 Hz, where the effectiveness of reducing sound leakage is most outstanding, the sound leakage is reduced by more than 20 dB. Compared to embodiment three, this scheme has a relatively balanced effect of reduced sound leakage on various frequency range, and this effect is better than the effect of schemes where the height of the holes are fixed, such as schemes of embodiment three, embodiment four, embodiment five, and so on.

In some embodiments, the sound guiding hole(s) at the upper portion of the sidewall of the housing 10 (also referred to as first hole(s)) may be approximately regarded as a point sound source. In some embodiments, the first hole(s) and the portion of the housing 10 that generates the leaked sound wave may constitute two-point sound sources (also referred to as first two-point sound sources). As for the first two-point sound sources, the guided sound wave generated by the first hole(s) (also referred to as first guided sound wave) may interfere with the leaked sound wave or a portion thereof generated by the portion of the housing 10 in a first region. In some embodiments, the sound waves output from the first two-point sound sources may have a same frequency (e.g., a first frequency). In some embodiments, the sound waves output from the first two-point sound sources may have a certain phase difference. In this case, the interference between the sound waves generated by the first two-point sound sources may reduce a sound pressure level of the leaked sound wave in the target region. When the position and phase difference of the first two-point sound sources meet certain conditions, the acoustic output device may output different sound effects in the near field (for example, the position of the user's ear) and the far field. For example, if the phases of the first two-point sound sources are opposite, that is, an absolute value of the phase difference between the first two-point sound sources is 180 degrees, the far-field leakage may be reduced according to the principle of reversed phase cancellation.

In some embodiments, the sound guiding hole(s) at the lower portion of the sidewall of the housing 10 (also referred to as second hole(s)) may also be approximately regarded as another point sound source. Similarly, the second hole(s) and the portion of the housing 10 that generates the leaked sound wave may also constitute two-point sound sources (also referred to as second two-point sound sources). As for the second two-point sound sources, the guided sound wave generated by the second hole(s) (also referred to as second guided sound wave) may interfere with the leaked sound wave or a portion thereof generated by the portion of the housing 10 in a second region. The second region may be the same as or different from the first region. In some embodiments, the sound waves output from the second two-point sound sources may have a same frequency (e.g., a second frequency).

In some embodiments, the first frequency and the second frequency may be in certain frequency ranges. In some embodiments, the frequency of the guided sound wave output from the sound guiding hole(s) may be adjustable. In some embodiments, the frequency of the first guided sound wave and/or the second guided sound wave may be adjusted by one or more acoustic routes. The acoustic routes may be coupled to the first hole(s) and/or the second hole(s). The first guided sound wave and/or the second guided sound wave may be propagated along the acoustic route having a specific frequency selection characteristic. That is, the first guided sound wave and the second guided sound wave may be transmitted to their corresponding sound guiding holes via different acoustic routes. For example, the first guided sound wave and/or the second guided sound wave may be propagated along an acoustic route with a low-pass characteristic to a corresponding sound guiding hole to output guided sound wave of a low frequency. In this process, the high frequency component of the sound wave may be absorbed or attenuated by the acoustic route with the low-pass characteristic. Similarly, the first guided sound wave and/or the second guided sound wave may be propagated along an acoustic route with a high-pass characteristic to the corresponding sound guiding hole to output guided sound wave of a high frequency. In this process, the low frequency component of the sound wave may be absorbed or attenuated by the acoustic route with the high-pass characteristic.

Figure 10D:
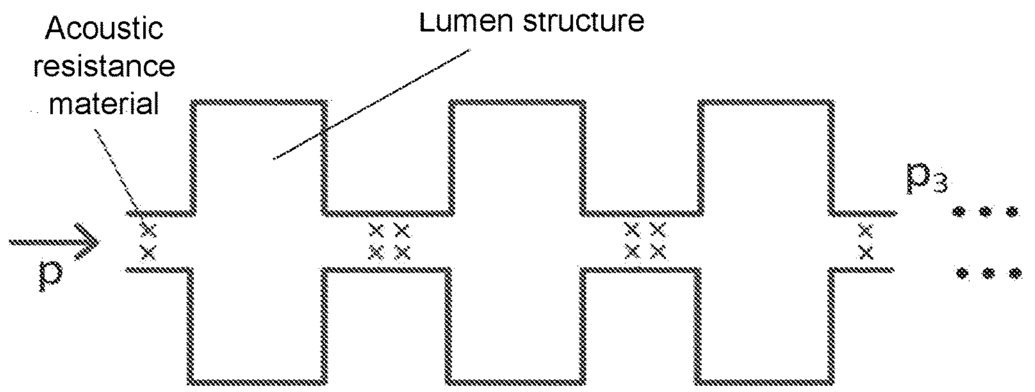
FIG. 10D is a schematic diagram illustrating an acoustic route according to some embodiments of the present disclosure.
Figure 10E:
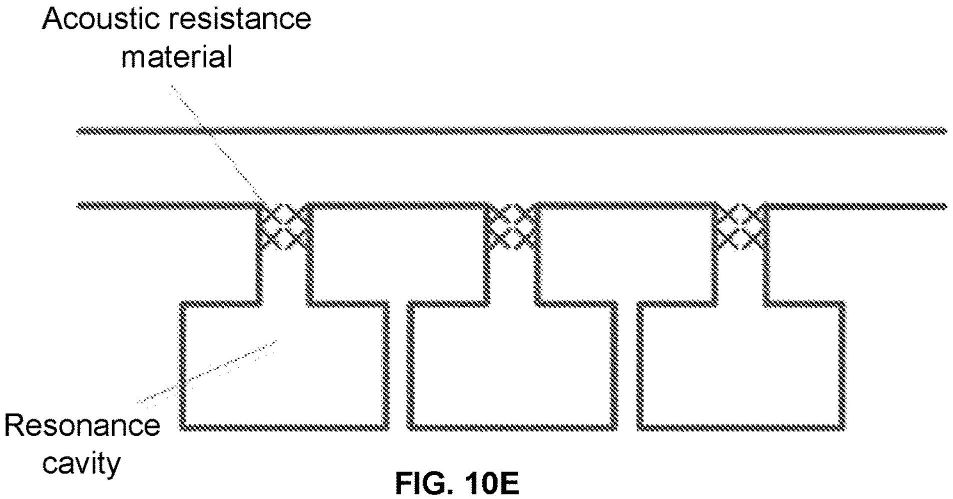
FIG. 10E is a schematic diagram illustrating another acoustic route according to some embodiments of the present disclosure.
Figure 10F:
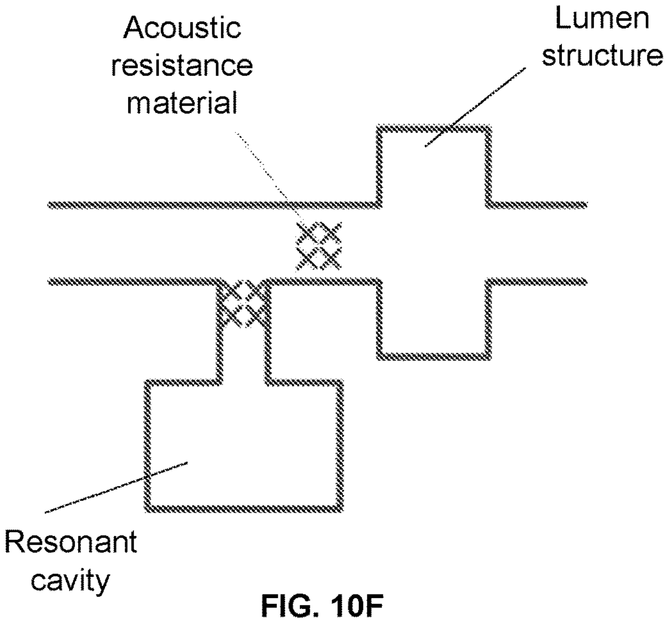
FIG. 10F is a schematic diagram illustrating a further acoustic route according to some embodiments of the present disclosure.

FIG. 10D is a schematic diagram illustrating an acoustic route according to some embodiments of the present disclosure. FIG. 10E is a schematic diagram illustrating another acoustic route according to some embodiments of the present disclosure. FIG. 10F is a schematic diagram illustrating a further acoustic route according to some embodiments of the present disclosure. In some embodiments, structures such as a sound tube, a sound cavity, a sound resistance, etc., may be set in the acoustic route for adjusting frequencies for the sound waves (e.g., by filtering certain frequencies). It should be noted that FIGS. 10D-10F may be provided as examples of the acoustic routes, and not intended be limiting.

As shown in FIG. 10D, the acoustic route may include one or more lumen structures. The one or more lumen structures may be connected in series. An acoustic resistance material may be provided in each of at least one of the one or more lumen structures to adjust acoustic impedance of the entire structure to achieve a desirable sound filtering effect. For example, the acoustic impedance may be in a range of 5 MKS Rayleigh to 500 MKS Rayleigh. In some embodiments, a high-pass sound filtering, a low-pass sound filtering, and/or a band-pass filtering effect of the acoustic route may be achieved by adjusting a size of each of at least one of the one or more lumen structures and/or a type of acoustic resistance material in each of at least one of the one or more lumen structures. The acoustic resistance materials may include, but not limited to, plastic, textile, metal, permeable material, woven material, screen material or mesh material, porous material, particulate material, polymer material, or the like, or any combination thereof. By setting the acoustic routes of different acoustic impedances, the acoustic output from the sound guiding holes may be acoustically filtered. In this case, the guided sound waves may have different frequency components.

As shown in FIG. 10E, the acoustic route may include one or more resonance cavities. The one or more resonance cavities may be, for example, Helmholtz cavity. In some embodiments, a high-pass sound filtering, a low-pass sound filtering, and/or a band-pass filtering effect of the acoustic route may be achieved by adjusting a size of each of at least one of the one or more resonance cavities and/or a type of acoustic resistance material in each of at least one of the one or more resonance cavities.

As shown in FIG. 10F, the acoustic route may include a combination of one or more lumen structures and one or more resonance cavities. In some embodiments, a high-pass sound filtering, a low-pass sound filtering, and/or a band-pass filtering effect of the acoustic route may be achieved by adjusting a size of each of at least one of the one or more lumen structures and one or more resonance cavities and/or a type of acoustic resistance material in each of at least one of the one or more lumen structures and one or more resonance cavities. It should be noted that the structures exemplified above may be for illustration purposes, various acoustic structures may also be provided, such as a tuning net, tuning cotton, etc.

In some embodiments, the interference between the leaked sound wave and the guided sound wave may relate to frequencies of the guided sound wave and the leaked sound wave and/or a distance between the sound guiding hole(s) and the portion of the housing 10. In some embodiments, the portion of the housing that generates the leaked sound wave may be the bottom of the housing 10. The first hole(s) may have a larger distance to the portion of the housing 10 than the second hole(s). In some embodiments, the frequency of the first guided sound wave output from the first hole(s) (e.g., the first frequency) and the frequency of second guided sound wave output from second hole(s) (e.g., the second frequency) may be different.

In some embodiments, the first frequency and second frequency may associate with the distance between the at least one sound guiding hole and the portion of the housing 10 that generates the leaked sound wave. In some embodiments, the first frequency may be set in a low frequency range. The second frequency may be set in a high frequency range. The low frequency range and the high frequency range may or may not overlap.

In some embodiments, the frequency of the leaked sound wave generated by the portion of the housing 10 may be in a wide frequency range. The wide frequency range may include, for example, the low frequency range and the high frequency range or a portion of the low frequency range and the high frequency range. For example, the leaked sound wave may include a first frequency in the low frequency range and a second frequency in the high frequency range. In some embodiments, the leaked sound wave of the first frequency and the leaked sound wave of the second frequency may be generated by different portions of the housing 10. For example, the leaked sound wave of the first frequency may be generated by the sidewall of the housing 10, the leaked sound wave of the second frequency may be generated by the bottom of the housing 10. As another example, the leaked sound wave of the first frequency may be generated by the bottom of the housing 10, the leaked sound wave of the second frequency may be generated by the sidewall of the housing 10. In some embodiments, the frequency of the leaked sound wave generated by the portion of the housing 10 may relate to parameters including the mass, the damping, the stiffness, etc., of the different portion of the housing 10, the frequency of the transducer 22, etc.

In some embodiments, the characteristics (amplitude, frequency, and phase) of the first two-point sound sources and the second two-point sound sources may be adjusted via various parameters of the acoustic output device (e.g., electrical parameters of the transducer 22, the mass, stiffness, size, structure, material, etc., of the portion of the housing 10, the position, shape, structure, and/or number (or count) of the sound guiding hole(s) so as to form a sound field with a particular spatial distribution. In some embodiments, a frequency of the first guided sound wave is smaller than a frequency of the second guided sound wave.

A combination of the first two-point sound sources and the second two-point sound sources may improve sound effects both in the near field and the far field.

Referring to FIGS. 4D, 7C, and 10C, by designing different two-point sound sources with different distances, the sound leakage in both the low frequency range and the high frequency range may be properly suppressed. In some embodiments, the closer distance between the second two-point sound sources may be more suitable for suppressing the sound leakage in the far field, and the relative longer distance between the first two-point sound sources may be more suitable for reducing the sound leakage in the near field. In some embodiments, the amplitudes of the sound waves generated by the first two-point sound sources may be set to be different in the low frequency range. For example, the amplitude of the guided sound wave may be smaller than the amplitude of the leaked sound wave. In this case, the sound pressure level of the near-field sound may be improved. The volume of the sound heard by the user may be increased.

Embodiment Seven

Figure 11A:
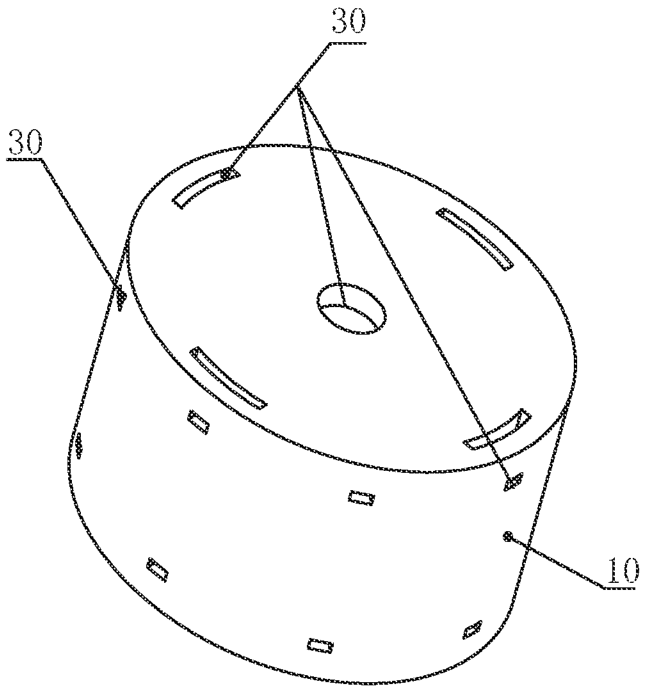
FIGS. 11A and 11B are schematic structures of an exemplary bone conduction speaker according to some embodiments of the present disclosure.
Figure 11B:
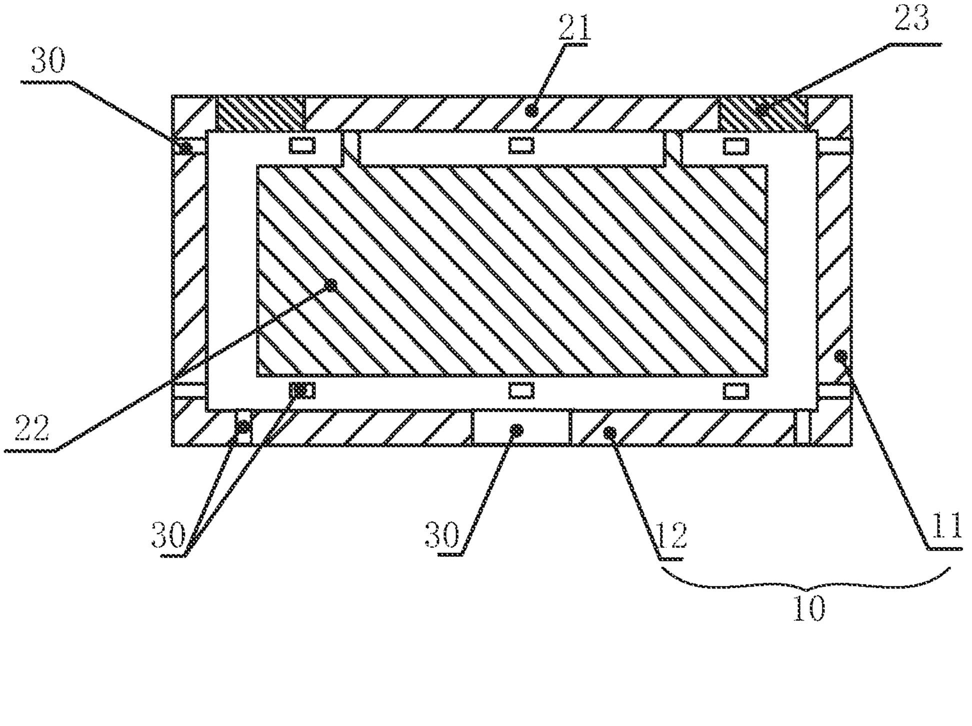

FIGS. 11A and 11B are schematic structures illustrating a bone conduction speaker according to some embodiments of the present disclosure. The bone conduction speaker may include an open housing 10, a vibration board 21 and a transducer 22. One or more perforative sound guiding holes 30 may be set on upper and lower portions of the sidewall of the housing 10 and on the bottom of the housing 10. The sound guiding holes 30 on the sidewall are arranged evenly or unevenly in one or more circles on the upper and lower portions of the sidewall of the housing 10. In some embodiments, the quantity of sound guiding holes 30 in every circle may be 8, and the upper portion sound guiding holes and the lower portion sound guiding holes may be symmetrical about the central cross section of the housing 10. In some embodiments, the shape of the sound guiding hole 30 may be rectangular. There may be four sound guiding holds 30 on the bottom of the housing 10. The four sound guiding holes 30 may be linear-shaped along arcs, and may be arranged evenly or unevenly in one or more circles with respect to the center of the bottom. Furthermore, the sound guiding holes 30 may include a circular perforative hole on the center of the bottom.

Figure 11C:
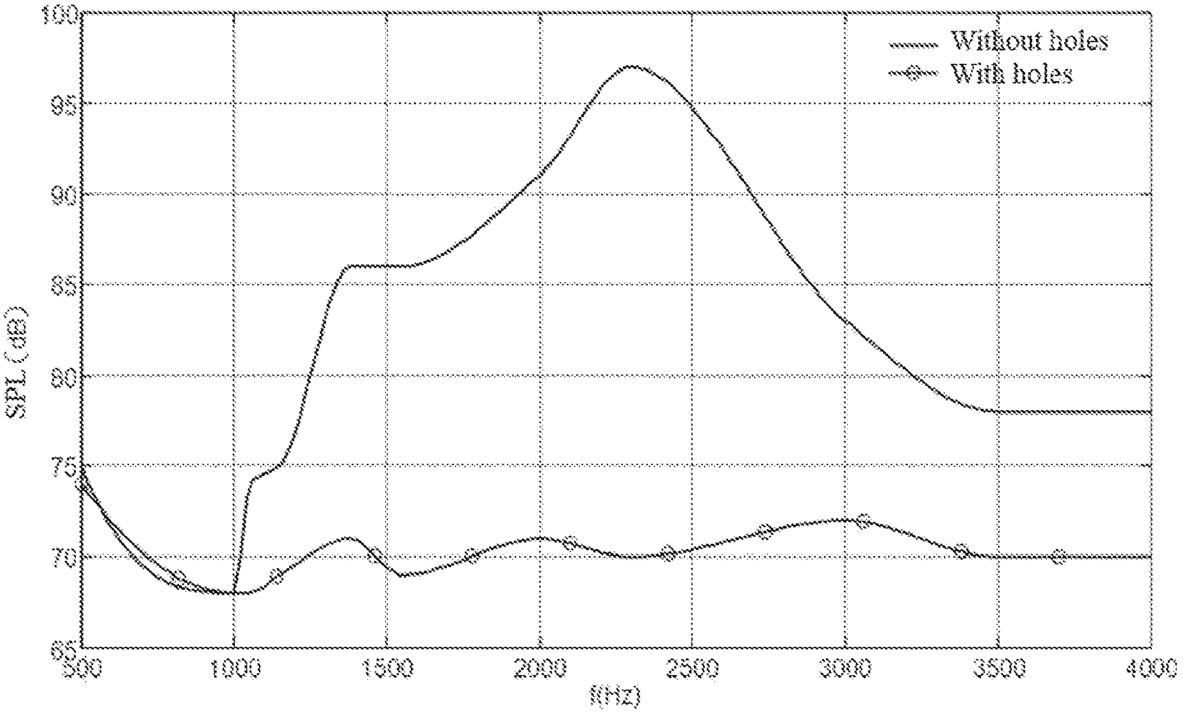
FIG. 11C is a diagram illustrating reduced sound leakage of a bone conduction speaker according to some embodiments of the present disclosure.

FIG. 11C is a diagram illustrating the effect of reducing sound leakage of the embodiment. In the frequency range of 1000 Hz~4000 Hz, the effectiveness of reducing sound leakage is outstanding. For example, in the frequency range of 1300 Hz~3000 Hz, the sound leakage is reduced by more than 10 dB; in the frequency range of 2000 Hz~2700 Hz, the sound leakage is reduced by more than 20 dB. Compared to embodiment three, this scheme has a relatively balanced effect of reduced sound leakage within various frequency range, and this effect is better than the effect of schemes where the height of the holes are fixed, such as schemes of embodiment three, embodiment four, embodiment five, and etc. Compared to embodiment six, in the frequency range of 1000 Hz~1700 Hz and 2500 Hz~4000 Hz, this scheme has a better effect of reduced sound leakage than embodiment six.

Embodiment Eight

Figure 12A:
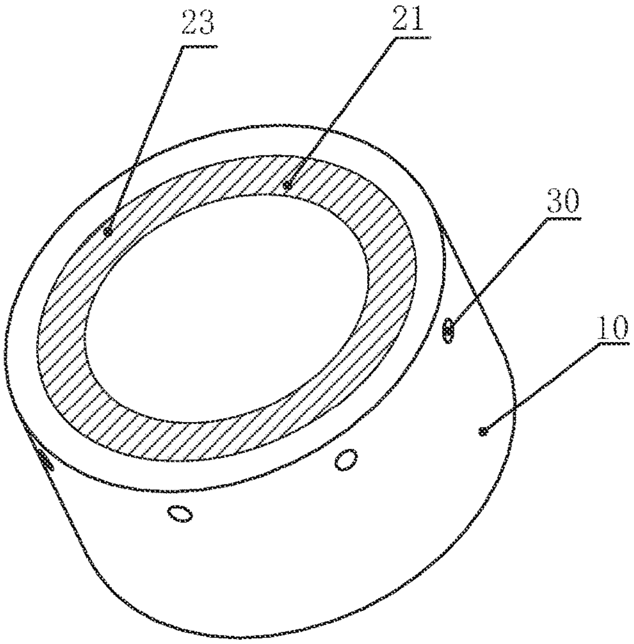
FIGS. 12A and 12B are schematic structures of an exemplary bone conduction speaker according to some embodiments of the present disclosure.
Figure 12B:
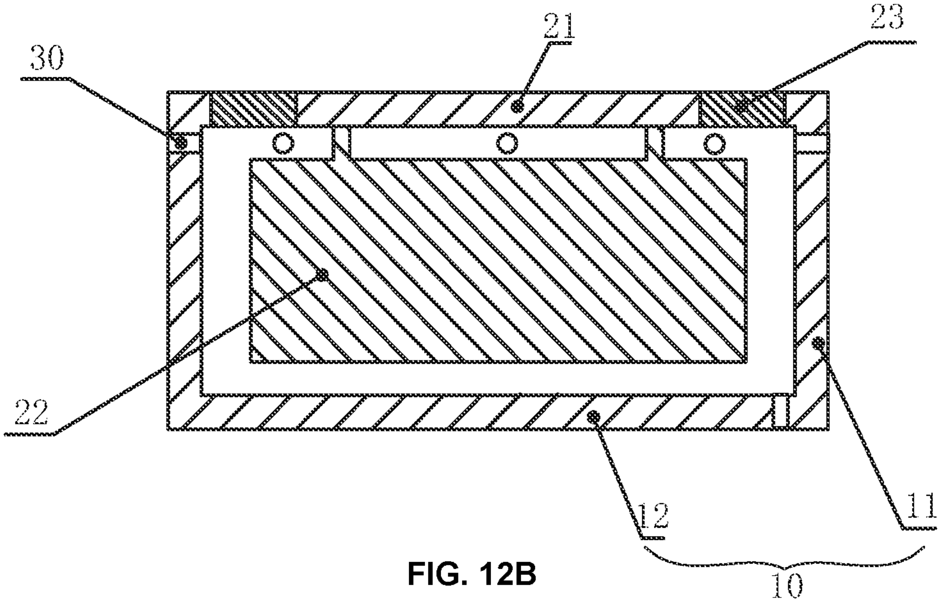

FIGS. 12A and 12B are schematic structures illustrating a bone conduction speaker according to some embodiments of the present disclosure. The bone conduction speaker may include an open housing 10, a vibration board 21 and a transducer 22. A perforative sound guiding hole 30 may be set on the upper portion of the sidewall of the housing 10. One or more sound guiding holes may be arranged evenly or unevenly in one or more circles on the upper portion of the sidewall of the housing 10. There may be 8 sound guiding holes 30, and the shape of the sound guiding holes 30 may be circle.

After comparison of calculation results and test results, the effectiveness of this embodiment is basically the same with that of embodiment one, and this embodiment can effectively reduce sound leakage.

Embodiment Nine

Figure 13A:
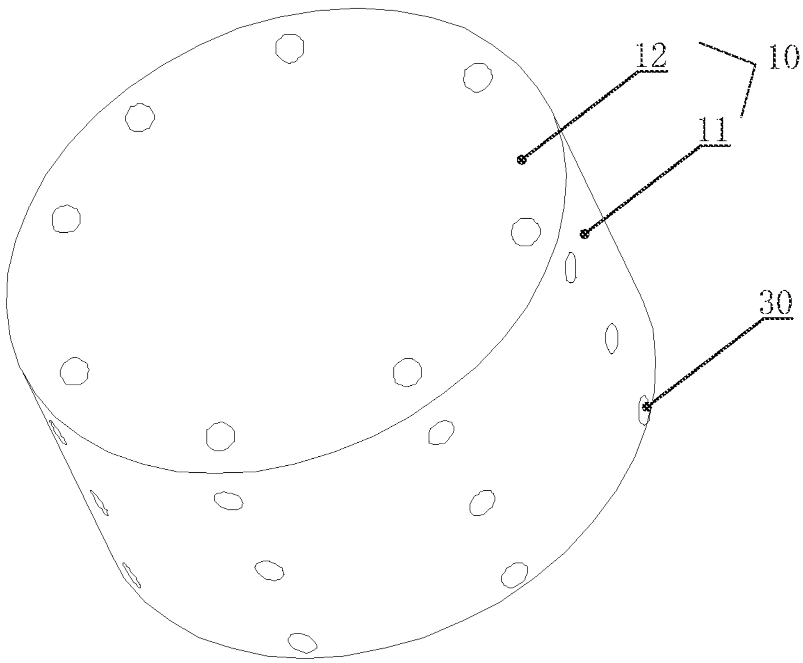
FIGS. 13A and 13B are schematic structures of an exemplary bone conduction speaker according to some embodiments of the present disclosure.
Figure 13B:
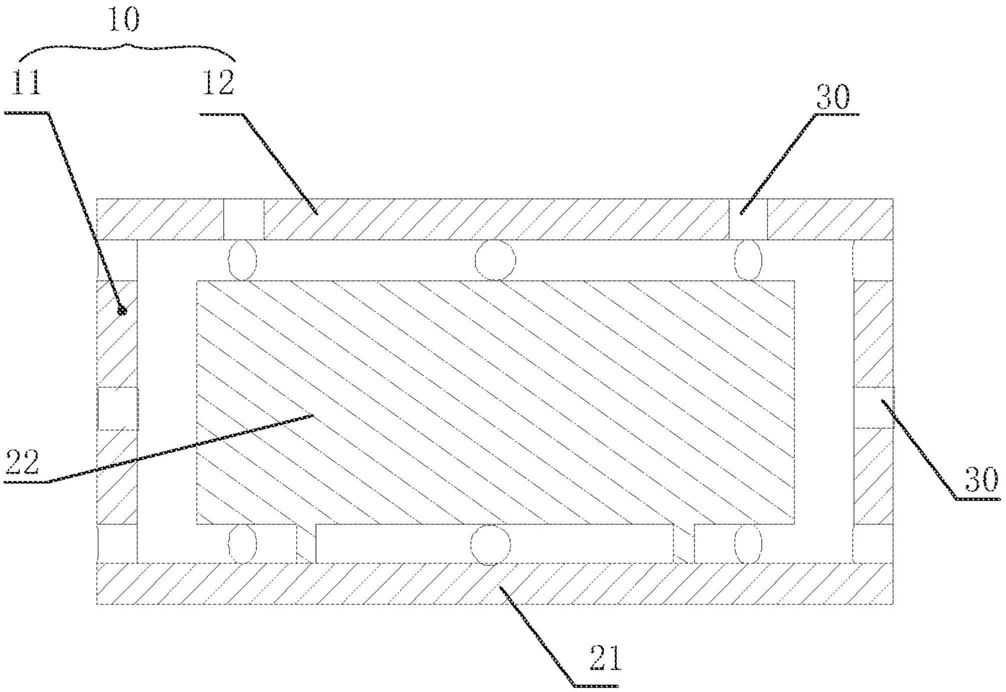

FIGS. 13A and 13B are schematic structures illustrating a bone conduction speaker according to some embodiments of the present disclosure. The bone conduction speaker may include an open housing 10, a vibration board 21 and a transducer 22.

The difference between this embodiment and the above-described embodiment three is that to reduce sound leakage to greater extent, the sound guiding holes 30 may be arranged on the upper, central and lower portions of the sidewall 11. The sound guiding holes 30 are arranged evenly or unevenly in one or more circles. Different circles are formed by the sound guiding holes 30, one of which is set along the circumference of the bottom 12 of the housing 10. The size of the sound guiding holes 30 are the same.

The effect of this scheme may cause a relatively balanced effect of reducing sound leakage in various frequency ranges compared to the schemes where the position of the holes are fixed. The effect of this design on reducing sound leakage is relatively better than that of other designs where the heights of the holes are fixed, such as embodiment three, embodiment four, embodiment five, etc.

Embodiment Ten

The sound guiding holes 30 in the above embodiments may be perforative holes without shields.

In order to adjust the effect of the sound waves guided from the sound guiding holes, a damping layer (not shown in the figures) may locate at the opening of a sound guiding hole 30 to adjust the phase and/or the amplitude of the sound wave.

There are multiple variations of materials and positions of the damping layer. For example, the damping layer may be made of materials which can damp sound waves, such as tuning paper, tuning cotton, nonwoven fabric, silk, cotton, sponge or rubber. The damping layer may be attached on the inner wall of the sound guiding hole 30, or may shield the sound guiding hole 30 from outside.

More preferably, the damping layers corresponding to different sound guiding holes 30 may be arranged to adjust the sound waves from different sound guiding holes to generate a same phase. The adjusted sound waves may be used to reduce leaked sound wave having the same wavelength. Alternatively, different sound guiding holes 30 may be arranged to generate different phases to reduce leaked sound wave having different wavelengths (i.e., leaked sound waves with specific wavelengths).

In some embodiments, different portions of a same sound guiding hole can be configured to generate a same phase to reduce leaked sound waves on the same wavelength (e.g., using a pre-set damping layer with the shape of stairs or steps). In some embodiments, different portions of a same sound guiding hole can be configured to generate different phases to reduce leaked sound waves on different wavelengths.

The above-described embodiments are preferable embodiments with various configurations of the sound guiding hole(s) on the housing of a bone conduction speaker, but a person having ordinary skills in the art can understand that the embodiments don't limit the configurations of the sound guiding hole(s) to those described in this application.

In the past bone conduction speakers, the housing of the bone conduction speakers is closed, so the sound source inside the housing is sealed inside the housing. In the embodiments of the present disclosure, there can be holes in proper positions of the housing, making the sound waves inside the housing and the leaked sound waves having substantially same amplitude and substantially opposite phases in the space, so that the sound waves can interfere with each other and the sound leakage of the bone conduction speaker is reduced. Meanwhile, the volume and weight of the speaker do not increase, the reliability of the product is not comprised, and the cost is barely increased. The designs disclosed herein are easy to implement, reliable, and effective in reducing sound leakage.

Figure 14:
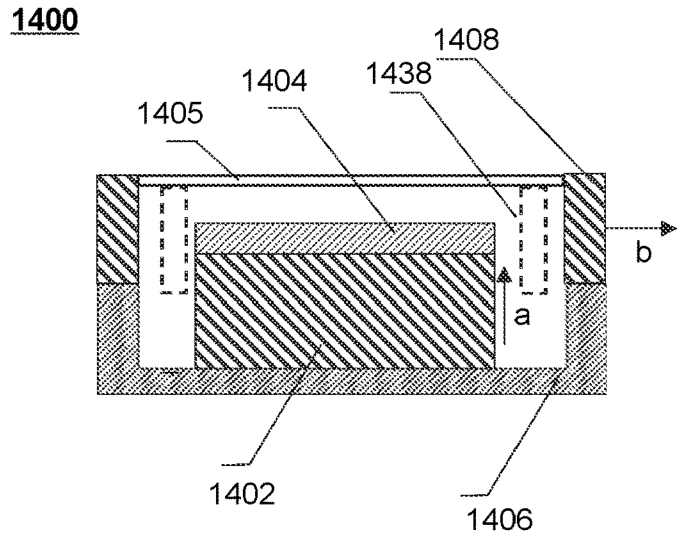
FIG. 14 is a schematic diagram illustrating a longitudinal sectional view of an exemplary bone conduction speaker according to some embodiments of the present disclosure.

FIG. 14 is a schematic diagram illustrating a longitudinal sectional view of an exemplary speaker 1400 according to some embodiments of the present disclosure. It should be noted that, without departing from the spirit and scope of the present disclosure, the contents described below may be applied to an air conduction speaker and a bone conduction speaker.

As shown in FIG. 14, in some embodiments, the speaker 1400 may include a first magnetic component 1402, a first magnetic conductive component 1404, a second magnetic conductive component 1406, a second magnetic component 1408, a vibration board 1405, and a voice coil 1438. One or more of the components of speaker 1400 may form a magnetic system. For example, the magnetic system may include the first magnetic component 1402, the first magnetic conductive component 1404, the second magnetic conductive component 1406, and the second magnetic component 1408. The magnetic system may generate a first total magnetic field (or referred to as a total magnetic field of the magnetic system or a first magnetic field). The first total magnetic field may be formed by all magnetic fields generated by all components of the magnetic system (e.g., the first magnetic component 1402, the first magnetic conductive component 1404, the second magnetic conductive component 1406, and the second magnetic component 1408). In some embodiments, the magnetic system and the voice coil 1438 may collectively be referred to as a transducer.

A magnetic component used herein refers to any component that may generate a magnetic field, such as a magnet. In some embodiments, a magnetic component may have a magnetization direction, which refers to the direction of a magnetic field inside the magnetic component. In some embodiments, the first magnetic component 1402 may include a first magnet, which may generate a second magnetic field, and the second magnetic component 1408 may include a second magnet. The first magnet and the second magnet may be of the same type or different types. In some embodiments, a magnet may include a metal alloy magnet, a ferrite, or the like. The metal alloy magnet may include neodymium iron boron, samarium cobalt, aluminum nickel cobalt, iron chromium cobalt, aluminum iron boron, iron carbon aluminum, or the like, or any combination thereof. The ferrite may include barium ferrite, steel ferrite, ferromanganese ferrite, lithium manganese ferrite, or the like, or any combination thereof.

A magnetic conductive component may also be referred to as a magnetic field concentrator or an iron core. The magnetic conductive component may be used to form a magnetic field loop. The magnetic conductive component may adjust the distribution of a magnetic field (e.g., the second magnetic field generated by the first magnetic component 1402). In some embodiments, the magnetic conductive component may include a soft magnetic material. Exemplary soft magnetic materials may include a metal material, a metal alloy material, a metal oxide material, an amorphous metal material, or the like. For example, the soft magnetic material may include iron, iron-silicon based alloy, iron-aluminum based alloy, nickel-iron based alloy, iron-cobalt based alloy, low carbon steel, silicon steel sheet, silicon steel sheet, ferrite, or the like. In some embodiments, the magnetic conductive component may be manufactured by, for example, casting, plastic processing, cutting processing, powder metallurgy, or the like, or any combination thereof. The casting may include sand casting, investment casting, pressure casting, centrifugal casting, or the like. The plastic processing may include rolling, casting, forging, stamping, extrusion, drawing, or the like, or any combination thereof. The cutting processing may include turning, milling, planning, grinding, or the like. In some embodiments, the magnetic conductive component may be manufactured by a 3D printing technique, a computer numerical control machine tool, or the like.

In some embodiments, one or more of the first magnetic component 1402, the first magnetic conductive component 1404, and the second magnetic conductive component 1406 may have an axisymmetric structure. The axisymmetric structure may include a ring structure, a columnar structure, or other axisymmetric structures. For example, the structure of the first magnetic component 1402 and/or the first magnetic conductive component 1404 may be a cylinder, a rectangular parallelepiped, or a hollow ring (e.g., a cross-section of the hollow ring may be the shape of a racetrack). As another example, the structure of the first magnetic component 1402 and the structure of the first magnetic conductive component 1404 may be coaxial cylinders having the same diameter or different diameters. In some embodiments, the second magnetic conductive component 1406 may have a groove-shaped structure. The groove-shaped structure may include a U-shaped cross section (as shown in FIG. 14). The groove-shaped second magnetic conductive component 1406 may include a bottom plate and a side wall. In some embodiments, the bottom plate and the side wall may form an integral assembly. For example, the side wall may be formed by extending the bottom plate in a direction perpendicular to the bottom plate. In some embodiments, the bottom plate may be mechanically connected to the side wall. As used herein, a mechanical connection between two components may include a bonded connection, a locking connection, a welded connection, a rivet connection, a bolted connection, or the like, or any combination thereof.

The second magnetic component 1408 may have a shape of a ring or a sheet. For example, the second magnetic component 1408 may have a ring shape. The second magnetic component 1408 may include an inner ring and an outer ring. In some embodiments, the shape of the inner ring and/or the outer ring may be a circle, an ellipse, a triangle, a quadrangle, or any other polygon. In some embodiments, the second magnetic component 1408 may include a plurality of magnets. Two ends of a magnet of the plurality of magnets may be mechanically connected to or have a certain distance from the ends of an adjacent magnet. The distance between the adjacent magnets may be the same or different. For example, the second magnetic component 1408 may include two or three sheet-like magnets which are arranged equidistantly. The shape of a sheet-like magnet may be a fan shape, a quadrangular shape, or the like. In some embodiments, the second magnetic component 1408 may be coaxial with the first magnetic component 1402 and/or the first magnetic conductive component 1404.

In some embodiments, an upper surface of the first magnetic component 1402 may be mechanically connected to a lower surface of the first magnetic conductive component 1404 as shown in FIG. 14. A lower surface of the first magnetic component 1402 may be mechanically connected to the bottom plate of the second magnetic conductive component 1406. A lower surface of the second magnetic component 1408 may be mechanically connected to the side wall of the second magnetic conductive component 1406.

In some embodiments, a magnetic gap may be formed between the first magnetic component 1402 (and/or the first magnetic conductive component 1404) and the inner ring of the second magnetic component 1408 (and/or the second magnetic conductive component 1406). The voice coil 1438 may be disposed in the magnetic gap and mechanically connected to the vibration board 1405. A voice coil refers to an element that may transmit an audio signal. The voice coil 1438 may be located in a magnetic field formed by the first magnetic component 1402, the first magnetic conductive component 1404, the second magnetic conductive component 1406, and the second magnetic component 1408. When a current is applied to the voice coil 1438, the ampere force generated by the magnetic field may drive the voice coil 1438 to vibrate. The vibration of the voice coil 1438 may drive the vibration board 1405 to vibrate to generate sound waves, which may be transmitted to a user's ears via air conduction and/or the bone conduction. In some embodiments, the distance between the bottom of the voice coil 1438 and the second magnetic conductive component 1406 may be equal to that between the bottom of the second magnetic component 1408 and the second magnetic conductive component 1406.

In some embodiments, for a speaker device having a single magnetic component, the magnetic induction lines passing through the voice coil 1438 may be uneven and divergent. A magnetic leakage may be formed in the magnetic system, that is, some magnetic induction lines may leak outside the magnetic gap and fail to pass through the voice coil 1438. This may result in a decrease in a magnetic induction intensity (or a magnetic field intensity) at the voice coil 1438, and affect the sensitivity of the speaker 1400. To eliminate or reduce the magnetic leakage, the speaker 1400 may further include at least one second magnetic component and/or at least one third magnetic conductive component (not shown in the figure). The at least one second magnetic component and/or at least one third magnetic conductive component may suppress the magnetic leakage and restrict the shape of the magnetic induction lines passing through the voice coil 1438, so that more magnetic induction lines may pass through the voice coil 1438 horizontally and densely to enhance the magnetic induction intensity (or the magnetic field intensity) at the voice coil 1438. The sensitivity and the mechanical conversion efficiency of the speaker 1400 (i.e., the efficiency of converting an electric energy into a mechanical energy of the vibration of the voice coil 1438) may be improved.

In some embodiments, the magnetic field intensity (or referred to as a magnetic induction intensity or a magnetic induction lines density) of the first total magnetic field within the magnetic gap may be greater than that of the second magnetic field within the magnetic gap. In some embodiments, the second magnetic component 1408 may generate a third magnetic field, and the third magnetic field may increase the magnetic field intensity of the first total magnetic field within the magnetic gap. The third magnetic field increasing the magnetic field intensity of the first total magnetic field within the magnetic gap refers to that the magnetic field intensity of the first total magnetic field when the third magnetic field exists (i.e., a magnetic system includes the second magnetic component 1408) is greater than that when the third magnetic field doesn't exist (i.e., a magnetic system does not include the second magnetic component 1408). As used herein, unless otherwise specified, a magnetic system refers to a system that includes all magnetic component(s) and magnetic conductive component(s). The first total magnetic field refers to a magnetic field generated by the magnetic system. Each of the second magnetic field, the third magnetic field, . . . , and the $N^{th}$ magnetic field refers to a magnetic field generated by a corresponding magnetic component. Different magnetic systems may unitize a same magnetic component or different magnetic components to generate the second magnetic field (or the third magnetic field, . . . , the $N^{th}$ magnetic field).

In some embodiments, an angle (denoted as A1) between the magnetization direction of the first magnetic component 1402 and the magnetization direction of the second magnetic component 1408 may be in a range from 0 degree to 180 degrees. For example, the angle A1 may be in a range from 45 degrees to 135 degrees. As another example, the angle A1 may be equal to or greater than 90 degrees. In some embodiments, the magnetization direction of the first magnetic component 1402 may be parallel to an upward direction (as indicated by an arrow a in FIG. 14) that is perpendicular to the lower surface or the upper surface of the first magnetic component 1402. The magnetization direction of the second magnetic component 1408 may be parallel to a direction directed from the inner ring to the outer ring of the second magnetic component 1408 (as indicated by an arrow b as shown in FIG. 14 that is on the right side of the first magnetic component 1402, which can be obtained by rotating the magnetization direction of the first magnetic component 1402 by 90 degrees clockwise). The magnetization direction of the second magnetic component 1408 may be perpendicular to that of the first magnetic component 1402.

In some embodiments, at the position of the second magnetic component 1408, an angle (denoted as A2) between the direction of the first total magnetic field and the magnetization direction of the second magnetic component 1408 may be not greater than 90 degrees. In some embodiments, at the position of the second magnetic component 1408, an angle (denoted as A3) between the direction of the magnetic field generated by the first magnetic component 1402 and the magnetization direction of the second magnetic component 1408 may be less than or equal to 90 degrees, such as 0 degree, 10 degrees, or 20 degrees. Compared with a magnetic system with a single magnetic component, the second magnetic component 1408 may increase the total magnetic induction lines within the magnetic gap of the magnetic system of the speaker 1400, thereby increasing the magnetic induction intensity within the magnetic gap. In addition, due to the second magnetic component 1408, the originally scattered magnetic induction lines may be converged to the position of the magnetic gap, which may further increase the magnetic induction intensity within the magnetic gap.

Figure 15:
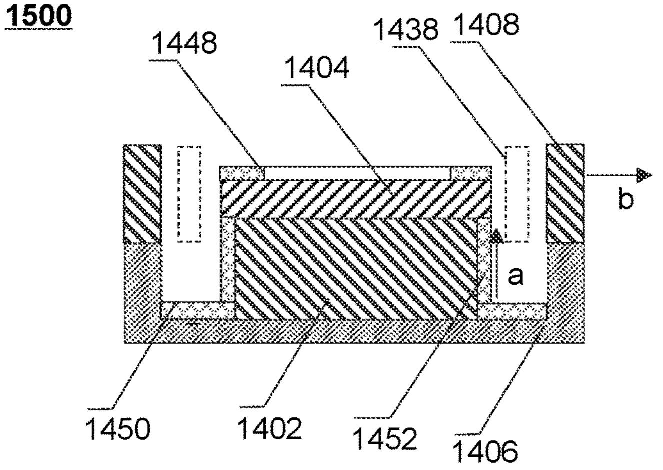
FIG. 15 is a schematic diagram illustrating a longitudinal sectional view of an exemplary magnetic system according to some embodiments of the present disclosure.

FIG. 15 is a schematic diagram illustrating a longitudinal sectional view of an exemplary magnetic system 1500 according to some embodiments of the present disclosure. As shown in FIG. 15, different from the magnetic system of the speaker 1400, the magnetic system 1500 may further include at least one electric conductive component (e.g., a first electric conductive component 1448, a second electric conductive component 14, and a third electric conductive component 1452).

In some embodiments, an electric conductive component may include a metal material, a metal alloy material, an inorganic non-metallic material, or other conductive material. Exemplary metal material may include gold, silver, copper, aluminum, or the like. Exemplary metal alloy material may include an iron-based alloy material, an aluminum-based alloy material, a copper-based alloy material, a zinc-based alloy material, or the like. Exemplary inorganic non-metallic material may include graphite, or the like. An electric conductive component may have a shape of a sheet, a ring, a mesh, or the like. The first electric conductive component 1448 may be disposed on the upper surface of the first magnetic conductive component 1404. The second electric conductive component 1450 may be mechanically connected to the first magnetic component 1402 and the second magnetic conductive component 1406. The third electric conductive component 1452 may be mechanically connected to the side wall of the first magnetic component 1402. In some embodiments, the first magnetic conductive component 1404 may protrude from the first magnetic component 1402 to form a first recess at the right side of the first magnetic component 1402 as shown in FIG. 15. The third electric conductive component 1452 may be disposed at the first recess. In some embodiments, the first electric conductive component 1448, the second electric conductive component 1450, and the third electric conductive component 1452 may include the same or different conductive materials.

In some embodiments, a magnetic gap may be formed between the first magnetic component 1402, the first magnetic conductive component 1404, and the inner ring of the second magnetic component 1408. The voice coil 1438 may be disposed in the magnetic gap. The first magnetic component 1402, the first magnetic conductive component 1404, the second magnetic conductive component 1406, and the second magnetic component 1408 may form the magnetic system 1500. In some embodiments, the electric conductive components of the magnetic system 1500 may reduce an inductive reactance of the voice coil 1438. For example, if a first alternating current is applied to the voice coil 1438, a first alternating magnetic field may be generated near the voice coil 1438. Under the action of the magnetic field of the magnetic system 1500, the first alternating magnetic field may cause the voice coil 1438 to generate an inductive reactance and hinder the movement of the voice coil 1438. One or more electric conductive components (e.g., the first electric conductive component 1448, the second electric conductive component 1450, and the third electric conductive component 1452) disposed near the voice coil 1438 may induce a second alternating current under the action of the first alternating magnetic field. The second alternating current induced by the electric conductive component(s) may generate a second alternating induction magnetic field in its vicinity. The direction of the second alternating magnetic field may be opposite to that of the first alternating magnetic field, and the first alternating magnetic field may be weakened. The inductive reactance of the voice coil 1438 may be reduced, the current in the voice coil 1438 may be increased, and the sensitivity of the speaker may be improved.

Figure 16:
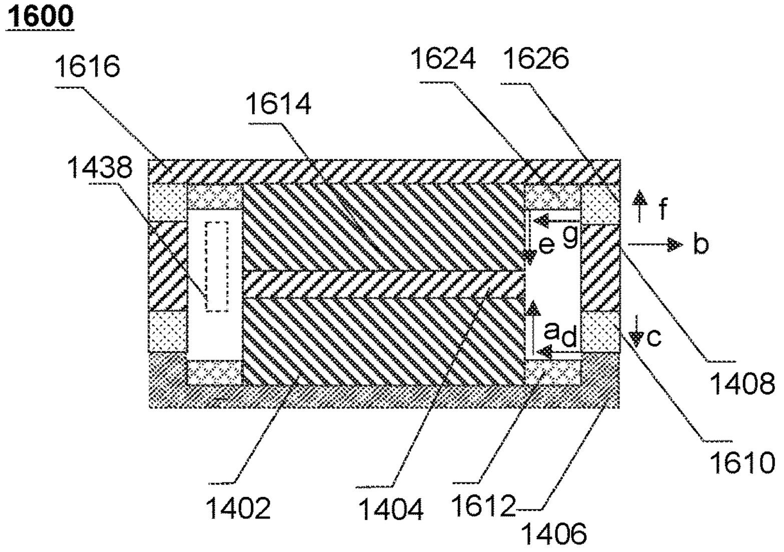
FIG. 16 is a schematic diagram illustrating a longitudinal sectional view of an exemplary magnetic system according to some embodiments of the present disclosure.

FIG. 16 is a schematic diagram illustrating a longitudinal sectional view of an exemplary magnetic system 1600 according to some embodiments of the present disclosure. As shown in FIG. 16, different from the magnetic system of the speaker 1400, the magnetic system 1600 may further include a third magnetic component 1610, a fourth magnetic component 1612, a fifth magnetic component 1614, a third magnetic conductive component 1616, a sixth magnetic component 1624, and a seventh magnetic component 1626. In some embodiments, the third magnetic component 1610, the fourth magnetic component 1612, the fifth magnetic component 1614, the third magnetic conductive component 1616, the sixth magnetic component 1624, and the seventh magnetic component 1626 may be coaxial circular cylinders.

In some embodiments, the upper surface of the second magnetic component 1408 may be mechanically connected to the seventh magnetic component 1626, and the lower surface of the second magnetic component 1408 may be mechanically connected to the third magnetic component 1610. The third magnetic component 1610 may be mechanically connected to the second magnetic conductive component 1406. An upper surface of the seventh magnetic component 1626 may be mechanically connected to the third magnetic conductive component 1616. The fourth magnetic component 1612 may be mechanically connected to the second magnetic conductive component 1406 and the first magnetic component 1402. The sixth magnetic component 1624 may be mechanically connected to the fifth magnetic component 1614, the third magnetic conductive component 1616, and the seventh magnetic component 1626. In some embodiments, the first magnetic component 1402, the first magnetic conductive component 1404, the second magnetic conductive component 1406, the second magnetic component 1408, the third magnetic component 1610, the fourth magnetic component 1612, the fifth magnetic component 1614, the third magnetic conductive component 1616, the sixth magnetic component 1624, and the seventh magnetic component 1626 may form a magnetic loop and a magnetic gap.

In some embodiments, an angle (denoted as A4) between the magnetization direction of the first magnetic component 1402 and the magnetization direction of the sixth magnetic component 1624 may be in a range from 0 degree to 180 degrees. For example, the angle A4 may be in a range from 45 degrees to 135 degrees. As another example, the angle A4 may be not greater than 90 degrees. In some embodiments, the magnetization direction of the first magnetic component 1402 may be parallel to an upward direction (as indicated by an arrow a in FIG. 16) that is perpendicular to the lower surface or the upper surface of the first magnetic component 1402. The magnetization direction of the sixth magnetic component 1624 may be parallel to a direction directed from the outer ring to the inner ring of the sixth magnetic component 1624 (as indicated by an arrow g in FIG. 16 that is on the right side of the first magnetic component 1402 after the magnetization direction of the first magnetic component 1402 rotates 270 degrees clockwise). In some embodiments, the magnetization direction of the sixth magnetic component 1624 may be the same as that of the fourth magnetic component 1612.

In some embodiments, at the position of the sixth magnetic component 1624, an angle (denoted as A5) between the direction of a magnetic field generated by the magnetic system 1600 and the magnetization direction of the sixth magnetic component 1624 may be not greater than 90 degrees. In some embodiments, at the position of the sixth magnetic component 1624, an angle (denoted as A6) between the direction of the magnetic field generated by the first magnetic component 1402 and the magnetization direction of the sixth magnetic component 1624 may be less than or equal to 90 degrees, such as 0 degree, 10 degrees, or 20 degrees.

In some embodiments, an angle (denoted as A7) between the magnetization direction of the first magnetic component 1402 and the magnetization direction of the seventh magnetic component 1626 may be in a range from 0 degree to 180 degrees. For example, the angle A7 may be in a range from 45 degrees to 135 degrees. As another example, the angle A7 may be not greater than 90 degrees. In some embodiments, the magnetization direction of the first magnetic component 1402 may be parallel to an upward direction (as indicated by an arrow a in FIG. 16) that is perpendicular to the lower surface or the upper surface of the first magnetic component 1402. The magnetization direction of the seventh magnetic component 1626 may be parallel to a direction directed from a lower surface to an upper surface of the seventh magnetic component 1626 (as indicated by an arrow f in FIG. 16 that is on the right side of the first magnetic component 1402 after the magnetization direction of the first magnetic component 1402 rotates 360 degrees clockwise). In some embodiments, the magnetization direction of the seventh magnetic component 1626 may be opposite to that of the third magnetic component 1610.

In some embodiments, at the seventh magnetic component 1626, an angle (denoted as A8) between the direction of the magnetic field generated by the magnetic system 1600 and the magnetization direction of the seventh magnetic component 1626 may be not greater than 90 degrees. In some embodiments, at the position of the seventh magnetic component 1626, an angle (denoted as A9) between the direction of the magnetic field generated by the first magnetic component 1402 and the magnetization direction of the seventh magnetic component 1626 may be less than or equal to 90 degrees, such as 0 degree, 10 degrees, or 20 degrees.

In the magnetic system 1600, the third magnetic conductive component 1616 may close the magnetic field loops generated by the magnetic system 1600, so that more magnetic induction lines may be concentrated in the magnetic gap. This may suppress the magnetic leakage, increase the magnetic induction intensity within the magnetic gap, and improve the sensitivity of the speaker.

Figure 17:
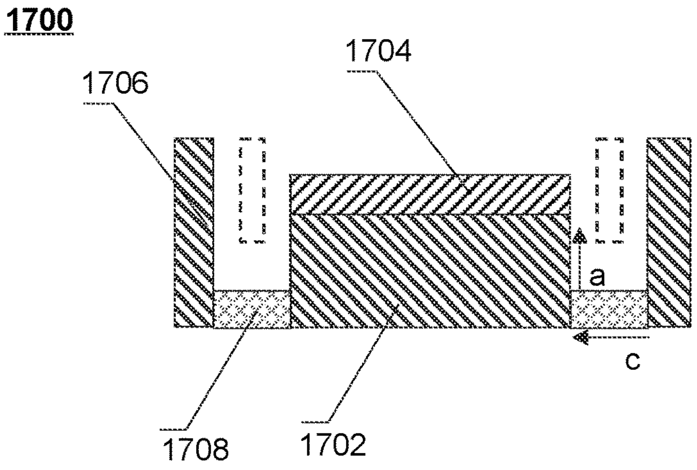
FIG. 17 is a schematic diagram illustrating a longitudinal sectional view of an exemplary magnetic system according to some embodiments of the present disclosure.

FIG. 17 is a schematic diagram illustrating a longitudinal sectional view of an exemplary magnetic system 1700 according to some embodiments of the present disclosure. As shown in FIG. 17, the magnetic system 1700 may include a first magnetic component 1702, a first magnetic conductive component 1704, a first magnetic field changing component 1706, and a second magnetic component 1708.

In some embodiments, an upper surface of the first magnetic component 1702 may be mechanically connected to the lower surface of the first magnetic conductive component 1704. The second magnetic component 1708 may be mechanically connected to the first magnetic component 1702 and the first magnetic field changing component 1706. Two or more of the first magnetic component 1702, the first magnetic conductive component 1704, the first magnetic field changing component 1706, and/or the second magnetic component 1708 may be connected to each other via a mechanical connection as described elsewhere in this disclosure (e.g., FIG. 14 and the relevant descriptions). In some embodiments, the first magnetic component 1702, the first magnetic conductive component 1704, the first magnetic field changing component 1706, and/or the second magnetic component 1708 may form a magnetic field loop and a magnetic gap.

In some embodiments, the magnetic system 1700 may generate a first total magnetic field, and the first magnetic component 1702 may generate a second magnetic field. The magnetic field intensity of the first total magnetic field within the magnetic gap may be greater than that of the second magnetic field within the magnetic gap. In some embodiments, the second magnetic component 1708 may generate a third magnetic field, and the third magnetic field may increase the intensity of the magnetic field of the second magnetic field at the magnetic gap.

In some embodiments, an angle (denoted as A10) between the magnetization direction of the first magnetic component 1702 and the magnetization direction of the second magnetic component 1708 may be in a range from 0 degree to 180 degrees. For example, the angle A10 may be in a range from 45 degrees to 135 degrees. As another example, the angle A10 may be not greater than 90 degrees.

In some embodiments, at the position of the second magnetic component 1708, an angle (denoted as A11) between the direction of the first total magnetic field and the magnetization direction of the second magnetic component 1708 may be not greater than 90 degrees. In some embodiments, at the position of the second magnetic component 1708, an angle (denoted as A12) between the direction of the second magnetic field generated by the first magnetic component 1702 and the magnetization direction of the second magnetic component 1708 may be less than or equal to 90 degrees, such as 0 degree, 10 degrees, and 20 degrees. In some embodiments, the magnetization direction of the first magnetic component 1702 may be parallel to an upward direction (as indicated by an arrow a in FIG. 17) that is perpendicular to the lower surface or the upper surface of the first magnetic component 1702. The magnetization direction of the second magnetic component 1708 may be parallel to a direction directed from the outer ring to the inner ring of the second magnetic component 1708 (as indicated by an arrow c in FIG. 17 that is on the right side of the first magnetic component 1702 after the magnetization direction of the first magnetic component 1702 rotates 90 degrees clockwise). Compared with a magnetic system with a single magnetic component, the first magnetic field changing component 1706 in the magnetic system 1700 may increase the total magnetic induction lines within the magnetic gap, thereby increasing the magnetic induction intensity within the magnetic gap. In addition, due to the first magnetic field changing component 1706, the originally scattered magnetic induction lines may be converged to the position of the magnetic gap, which may further increase the magnetic induction intensity within the magnetic gap.

Figure 18:
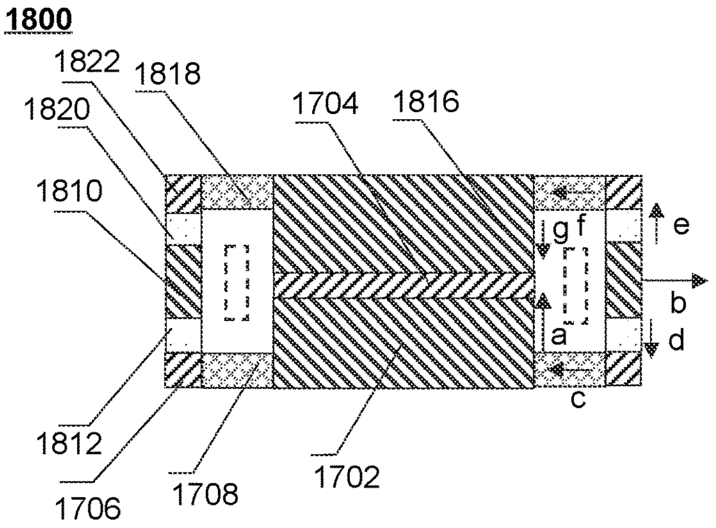
FIG. 18 is a schematic diagram illustrating a longitudinal sectional view of an exemplary magnetic system according to some embodiments of the present disclosure.

FIG. 18 is a schematic diagram illustrating a longitudinal sectional view of an exemplary magnetic system 1800 according to some embodiments of the present disclosure. As shown in FIG. 18, in some embodiments, the magnetic system 1800 may include a first magnetic component 1702, a first magnetic conductive component 1704, a first magnetic field changing component 1706, a second magnetic component 1708, a third magnetic component 1810, a fourth magnetic component 1812, a fifth magnetic component 1816, a sixth magnetic component 1818, a seventh magnetic component 1820, and a second ring component 1822. In some embodiments, the first magnetic field changing component 1706 and/or the second ring component 1822 may include a ring-shaped magnetic component or a ring-shaped magnetic conductive component.

A ring-shaped magnetic component may include any one or more magnetic materials as described elsewhere in this disclosure (e.g., FIG. 14 and the relevant descriptions). A ring-shaped magnetic conductive component may include any one or more magnetically conductive materials described in the present disclosure (e.g., FIG. 14 and the relevant descriptions).

In some embodiments, the sixth magnetic component 1818 may be mechanically connected to the fifth magnetic component 1816 and the second ring component 1822. The seventh magnetic component 1820 may be mechanically connected to the third magnetic component 1810 and the second ring component 1822. In some embodiments, one or more of the first magnetic component 1702, the fifth magnetic component 1816, the second magnetic component 1708, the third magnetic component 1810, the fourth magnetic component 1812, the sixth magnetic component 1818, the seventh magnetic component 1820, the first magnetic conductive component 1704, the first magnetic field changing component 1706, and the second ring component 1822 may form a magnetic field loop.

In some embodiments, an angle (denoted as A13) between the magnetization direction of the first magnetic component 1702 and the magnetization direction of the sixth magnetic component 1818 may be in a range from 0 degree and 180 degrees. For example, the angle A13 may be in a range from 45 degrees to 135 degrees. As another example, the angle A13 may be not greater than 90 degrees. In some embodiments, the magnetization direction of the first magnetic component 1702 may be parallel to an upward direction (as indicated by an arrow a in FIG. 18) that is perpendicular to the lower surface or the upper surface of the first magnetic component 1702. The magnetization direction of the sixth magnetic component 1818 may be parallel to a direction directed from the outer ring to the inner ring of the sixth magnetic component 1818 (as indicated by an arrow f in FIG. 18 that is on the right side of the first magnetic component 1702 after the magnetization direction of the first magnetic component 1402 rotates 270 degrees clockwise). In some embodiments, the magnetization direction of the sixth magnetic component 1818 may be the same as that of the second magnetic component 1708. The magnetization direction of the seventh magnetic component 1820 may be parallel to a direction directed from the lower surface to the upper surface of the seventh magnetic component 1820 (as indicated by an arrow e in FIG. 18 that is on the right side of the first magnetic component 1702 after the magnetization direction of the first magnetic component 1702 rotates 90 degrees clockwise). In some embodiments, the magnetization direction of the seventh magnetic component 1820 may be the same as that of the fourth magnetic component 1812.

In some embodiments, at the position of the sixth magnetic component 1818, an angle (denoted as A14) between the direction of the magnetic field generated by the magnetic system 1800 and the magnetization direction of the sixth magnetic component 1818 may be not greater than 90 degrees. In some embodiments, at the position of the sixth magnetic component 1818, an angle (denoted as A15) between the direction of the magnetic field generated by the first magnetic component 1702 and the magnetization direction of the sixth magnetic component 1818 may be less than or equal to 90 degrees, such as 0 degree, 10 degrees, and 20 degrees.

In some embodiments, an angle (denoted as A16) between the magnetization direction of the first magnetic component 1702 and the magnetization direction of the seventh magnetic component 1820 may be in a range from 0 degree and 180 degrees. For example, the angle A16 may be in a range from 45 degrees to 135 degrees. As another example, the angle A16 may be not greater than 90 degrees.

In some embodiments, at the position of the seventh magnetic component 1820, an angle (denoted as A17) between the direction of the magnetic field generated by the magnetic system 1800 and the magnetization direction of the seventh magnetic component 1820 may be not greater than 90 degrees. In some embodiments, at the position of the seventh magnetic component 1820, an angle (denoted as A18) between the direction of the magnetic field generated by the first magnetic component 1702 and the magnetization direction of the seventh magnetic component 1820 may be less than or equal to 90 degrees, such as 0 degree, 10 degrees, and 20 degrees.

In some embodiments, the first magnetic field changing component 1706 may be a ring-shaped magnetic component. The magnetization direction of the first magnetic field changing component 1706 may be the same as that of the second magnetic component 1708 or the fourth magnetic component 1812. For example, on the right side of the first magnetic component 1702, the magnetization direction of the first magnetic field changing component 1706 may be parallel to a direction directed from the outer ring to the inner ring of the first magnetic field changing component 1706. In some embodiments, the second ring component 1822 may be a ring-shaped magnetic component. The magnetization direction of the second ring component 1822 may be the same as that of the sixth magnetic component 1818 or the seventh magnetic component 1820. For example, on the right side of the first magnetic component 1702, the magnetization direction of the second ring component 1822 may be parallel to a direction directed from the outer ring to the inner ring of the second ring component 1822. In the magnetic system 1800, the plurality of magnetic components may increase the total magnetic induction lines, and different magnetic components may interact, which may suppress the leakage of the magnetic induction lines, increase the magnetic induction intensity within the magnetic gap, and improve the sensitivity of the speaker.

In some embodiments, the magnetic system 1800 may further include a magnetic conductive cover. The magnetic conductive cover may include one or more magnetic conductive materials (e.g., low carbon steel, silicon steel sheet, silicon steel sheet, ferrite, etc.) described in the present disclosure. For example, the magnetic conductive cover may be mechanically connected to the first magnetic component 1702, the first magnetic field changing component 1706, the second magnetic component 1708, the third magnetic component 1810, the fourth magnetic component 1812, the fifth magnetic component 1816, the sixth magnetic component 1818, the seventh magnetic component 1820, and the second ring component 1822. In some embodiments, the magnetic conductive cover may include at least one bottom plate and a side wall. The side wall may have a ring structure. The at least one bottom plate and the side wall may form an integral assembly. Alternatively, the at least one bottom plate may be mechanically connected to the side wall via one or more mechanical connections as described elsewhere in the present disclosure. For example, the magnetic conductive cover may include a first base plate, a second base plate, and a side wall. The first bottom plate and the side wall may form an integral assembly, and the second bottom plate may be mechanically connected to the side wall via one or more mechanical connections described elsewhere in the present disclosure.

In the magnetic system 1700, the magnetic conductive cover may close the magnetic field loops_generated by the magnetic system 1700, so that more magnetic induction lines may be concentrated in the magnetic gap in the magnetic system 1700. This may suppress the magnetic leakage, increase the magnetic induction intensity at the magnetic gap, and improve the sensitivity of the speaker.

In some embodiments, the magnetic system 1700 may further include one or more electric conductive components (e.g., a first electric conductive component, a second electric conductive component, and a third electric conductive component). The one or more electric conductive components may be similar to the first electric conductive component 1448, the second electric conductive component 1450, and the third electric conductive component 1452 as described in connection with FIG. 15.

Figure 19:
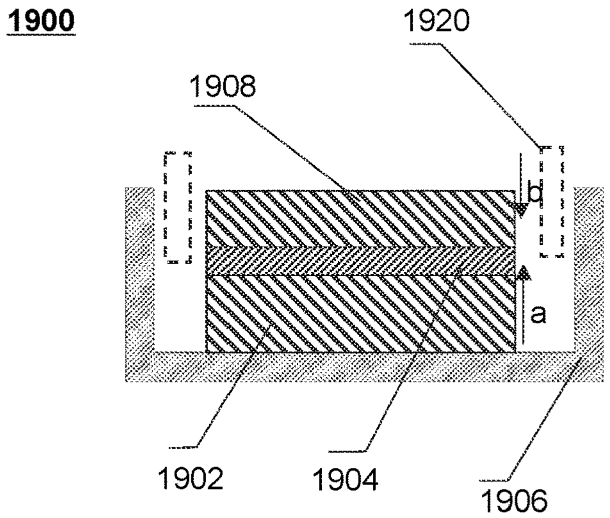
FIG. 19 is a schematic diagram illustrating a longitudinal sectional view of an exemplary magnetic system according to some embodiments of the present disclosure.

FIG. 19 is a schematic diagram illustrating a longitudinal sectional view of an exemplary magnetic system 1900 according to some embodiments of the present disclosure. As shown in FIG. 19, the magnetic system 1900 may include a first magnetic component 1902, a first magnetic conductive component 1904, a second magnetic conductive component 1906, and a second magnetic component 1908.

In some embodiments, the first magnetic component 1902 and/or the second magnetic component 1908 may include one or more of the magnets described in the present disclosure. In some embodiments, the first magnetic component 1902 may include a first magnet, and the second magnetic component 1908 may include a second magnet. The first magnet and the second magnet may be the same or different.

The first magnetic conductive component 1904 and/or the second magnetic conductive component 1906 may include one or more magnetic conductive materials described in the present disclosure. The first magnetic conductive component 1904 and/or the second magnetic conductive component 1906 may be manufactured by one or more processing methods described in the present disclosure. In some embodiments, the first magnetic component 1902, the first magnetic conductive component 1904, and/or the second magnetic component 1908 may have an axisymmetric structure. For example, each of the first magnetic component 1902, the first magnetic conductive component 1904, and/or the second magnetic component 1908 may be a cylinder. In some embodiments, the first magnetic component 1902, the first magnetic conductive component 1904, and/or the second magnetic component 1908 may be coaxial cylinders containing the same or different diameters. The thickness of the first magnetic component 1902 may be greater than or equal to that of the second magnetic component 1908. In some embodiments, the second magnetic conductive component 1906 may have a groove-shaped structure. In some embodiments, the groove-shaped structure may include a U-shaped cross section. The groove-shaped second magnetic conductive component 1906 may include a bottom plate and a sidewall. In some embodiments, the bottom plate and the side wall may form an integral assembly. For example, the side wall may be formed by extending the bottom plate in a direction perpendicular to the bottom plate. In some embodiments, the bottom plate may be mechanically connected to the side wall via a mechanical connection as described elsewhere in this disclosure (e.g., FIG. 14 and the relevant descriptions). The second magnetic component 1908 may have a shape of a ring or a sheet. The shape of the second magnetic component 1908 may be similar to that of the second magnetic component 1408 as described in connection with FIG. 15. In some embodiments, the second magnetic component 1908 may be coaxial with the first magnetic component 1902 and/or the first magnetic conductive component 1904.

In some embodiments, an upper surface of the first magnetic component 1902 may be mechanically connected to a lower surface of the first magnetic conductive component 1904. A lower surface of the first magnetic component 1902 may be mechanically connected to the bottom plate of the second magnetic conductive component 1906. A lower surface of the second magnetic component 1908 may be mechanically connected to an upper surface of the first magnetic conductive component 1904. Two or more of the first magnetic component 1902, the first magnetic conductive component 1904, the second magnetic conductive component 1906, and/or the second magnetic component 1908 may be connected to each other via a mechanical connection as described elsewhere in this disclosure (e.g., FIG. 20 and the relevant descriptions).

In some embodiments, a magnetic gap may be formed between the first magnetic component 1902, the first magnetic conductive component 1904, the second magnetic component 1908 and a sidewall of the second magnetic conductive component 1906. A voice coil 1920 may be disposed in a magnetic gap. In some embodiments, the first magnetic component 1902, the first magnetic conductive component 1904, the second magnetic conductive component 1906, and the second magnetic component 1908 may form a magnetic field loop. In some embodiments, the magnetic system 1900 may generate a first total magnetic field, and the first magnetic component 1902 may generate a second magnetic field. The first total magnetic field may be formed by all magnetic fields generated by all components of the magnetic system 1900 (e.g., the first magnetic component 1902, the first magnetic conductive component 1904, the second magnetic conductive component 1906, and the second magnetic component 1908). The intensity of the magnetic field (or referred to as a magnetic induction intensity or a magnetic induction lines density) within the magnetic gap of the first total magnetic field may be greater than the intensity of the magnetic field within the magnetic gap of the second magnetic field. In some embodiments, the second magnetic component 1908 may generate a third magnetic field, and the third magnetic field may increase the intensity of the magnetic field of the second magnetic field within the magnetic gap.

In some embodiments, an angle (denoted as A19) between the magnetization direction of the second magnetic component 1908 and the magnetization direction of the first magnetic component 1902 may be in a range from 90 degrees and 180 degrees. For example, the angle A10 may be in a range from 150 degrees to 180 degrees. Merely by way of example, the magnetization direction of the second magnetic component 1908 (as indicated by an arrow b in FIG. 19) may be opposite to the magnetization direction of the first magnetic component 1902 (as indicated by an arrow a in FIG. 19).

Compared with the magnetic system with a single magnetic component, the magnetic system 1900 includes a second magnetic component 1908. The second magnetic component 1908 may have a magnetization direction opposite to that of the first magnetic component 1902, which may suppress the magnetic leakage of the first magnetic component 1902 in its magnetization direction, so that more magnetic induction lines generated by the first magnetic component 1902 may be concentrated in the magnetic gap, thereby increasing the magnetic induction intensity within the magnetic gap.

It should be noted that the above description regarding the magnetic systems is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, a magnetic system may include one or more additional components and/or one or more components of the speaker described above may be omitted. Additionally or alternatively, two or more components of a magnetic system may be integrated into a single component. A component of the magnetic system may be implemented on two or more sub-components.

It's noticeable that above statements are preferable embodiments and technical principles thereof. A person having ordinary skill in the art is easy to understand that this disclosure is not limited to the specific embodiments stated, and a person having ordinary skill in the art can make various obvious variations, adjustments, and substitutes within the protected scope of this disclosure. Therefore, although above embodiments state this disclosure in detail, this disclosure is not limited to the embodiments, and there can be many other equivalent embodiments within the scope of the present disclosure, and the protected scope of this disclosure is determined by following claims.

What is claimed is:

1. A speaker, comprising:

a housing;

a transducer residing inside the housing and configured to generate vibrations, the vibrations producing a sound wave inside the housing and causing a leaked sound wave spreading outside the housing, the transducer including a magnetic system, wherein the magnetic system includes a first magnetic component that has a first magnetization direction;

a second magnetic component that has a second magnetization direction; and a first magnetic conductive component disposed between the first magnetic component and the second magnetic component; and at least one sound guiding hole located on the housing and configured to guide the sound wave inside the housing through the at least one sound guiding hole to an outside of the housing, the guided sound wave having a phase different from a phase of the leaked sound wave, the guided sound wave interfering with the leaked sound wave in a target region, wherein the at least one sound guiding hole includes a damping layer, the damping layer being configured to adjust the phase of the guided sound wave in the target region.

2. The speaker of claim 1, wherein an angle between the second magnetization direction of the second magnetic component and the first magnetization direction of the first magnetic component is in a range from 90 degrees to 180 degrees.

3. The speaker of claim 2, wherein the second magnetization direction of the second magnetic component is opposite to the first magnetization direction of the first magnetic component.

4. The speaker of claim 1, wherein the first magnetic conductive component is mechanically connected to an upper surface of the first magnetic component.

5. The speaker of claim 4, wherein the first magnetic conductive component is mechanically connected to a lower surface of the second magnetic component.

6. The speaker of claim 4, wherein the first magnetic component, the first magnetic conductive component, or the second magnetic component have an axisymmetric structure.

7. The speaker of claim 4, wherein the magnetic system further comprises:

a second magnetic conductive component mechanically connected to a lower surface of the first magnetic component, the lower surface being opposite to the upper surface of the first magnetic component.

8. The speaker of claim 7, wherein a magnetic gap is formed between the first magnetic component, the first magnetic conductive component, the second magnetic component, and a sidewall of the second magnetic conductive component.

9. The speaker of claim 8, wherein a voice coil is disposed in the magnetic gap.

10. The speaker of claim 9, wherein the first magnetic component, the first magnetic conductive component, the second magnetic conductive component, and the second magnetic component form a magnetic field loop.

11. The speaker of claim 8, wherein the magnetic system generates a first magnetic field, and the first magnetic component generates a second magnetic field.

12. The speaker of claim 11, wherein an intensity of the first magnetic field in the magnetic gap is greater than an intensity of the second magnetic field in the magnetic gap.

13. The speaker of claim 12, wherein the second magnetic component generates a third magnetic field, the third magnetic field increasing an intensity of the second magnetic field in the magnetic gap.

14. The speaker of claim 1, wherein the housing includes a bottom or a sidewall; and the at least one sound guiding hole is located on the bottom or the sidewall of the housing.

15. The speaker of claim 1, wherein the guided sound wave includes at least two sound waves having different phases.

16. The speaker of claim 15, wherein the at least one sound guiding hole includes two sound guiding holes located on the housing.

17. The speaker of claim 16, wherein the two sound guiding holes are arranged to generate the at least two sound waves having different phases to reduce the sound pressure level of the leaked sound wave having different wavelengths.

18. The speaker of claim 1, wherein at least a portion of the leaked sound wave whose sound pressure level is reduced is within a range of 1500 Hz to 3000 Hz.

19. The speaker of claim 18, wherein the sound pressure level of the at least a portion of the leaked sound wave is reduced by more than 10 dB on average.

20. The speaker of claim 15, wherein different portions of the at least one sound guiding hole are configured to generate the at least two sound waves having different phases.

* * * * *